US012608737B1

(12) United States Patent
Knudson et al.

(10) Patent No.: US 12,608,737 B1
(45) Date of Patent: Apr. 21, 2026

(54) DYNAMIC RECOMMENDATIONS BASED ON CUSTOMER PROFILES

(71) Applicant: Block, Inc., Oakland, CA (US)

(72) Inventors: Aubrey Knudson, Atlanta, GA (US); Zoe Allen, New York, NY (US); Ashley Baker, Los Angeles, CA (US); John Barton Wheeler, Chicago, IL (US)

(73) Assignee: Block, Inc., Oakland, CA (US)

( * ) Notice: Subject to any disclaimer, the term of this patent is extended or adjusted under 35 U.S.C. 154(b) by 238 days.

(21) Appl. No.: 18/353,562

(22) Filed: Jul. 17, 2023

(51) Int. Cl.
*G06Q 30/00* (2023.01)
*G06Q 30/0601* (2023.01)
(52) U.S. Cl.
CPC ................................. *G06Q 30/0631* (2013.01)
(58) Field of Classification Search
CPC ................................................ G06Q 30/06–08
See application file for complete search history.

(56) References Cited

U.S. PATENT DOCUMENTS

2014/0164046 A1* 6/2014 Haralambos ............ G07F 9/001
705/7.25
2015/0088676 A1* 3/2015 Elliott .................... G06Q 20/29
705/21
2021/0158263 A1* 5/2021 Mimassi ............. G06F 16/9035
2021/0264502 A1* 8/2021 Mozafarian ........ G06Q 30/0643

OTHER PUBLICATIONS

Ashraf, Maheen et al., "Issues, Challenges, and Opportunities in Food Recommender Systems", 2022 Int'l Conf. on Data Analytics for Business and Industry, IEEE Explore (Year: 2022).*

* cited by examiner

*Primary Examiner* — Ethan D Civan
(74) *Attorney, Agent, or Firm* — Lee & Hayes, P.C.

(57) ABSTRACT

Dynamic recommendations based on customer profiles is described. A computing system may receive, in association with a visit of a customer to a merchant location of a merchant, an identifier (ID) of the customer. The computing system may access, based at least in part on the ID, a customer profile of the customer. The computing system may access item availability data indicating whether items are in stock at the merchant location. The computing system may generate, based at least in part on the customer profile and the item availability data, a recommendation(s) associated with an item(s) that is in stock at the merchant location. The computing system may receive an indication that the customer is at the merchant location, and in response to the receiving of the indication, the computing system may determine a server, and cause an electronic device of the server to output the recommendation(s).

20 Claims, 13 Drawing Sheets

800

RECEIVE CUSTOMER IDENTIFIER(S) (ID(S)) IN ASSOCIATION WITH A VISIT OF A CUSTOMER(S) TO A MERCHANT LOCATION
802

ACCESS A CUSTOMER PROFILE BASED ON THE CUSTOMER ID(S)
804

ACCESS ITEM AVAILABILITY DATA INDICATING WHETHER ITEMS ARE IN STOCK AT THE MERCHANT LOCATION
806

GENERATE A RECOMMENDATION ASSOCIATED WITH AN IN-STOCK ITEM BASED ON THE CUSTOMER PROFILE AND THE ITEM AVAILABILITY DATA
808

DETERMINE A SERVER (E.G., A SERVER ASSIGNED TO THE TABLE WHERE THE CUSTOMER IS SEATED)
812

YES

IS CUSTOMER AT THE MERCHANT LOCATION (E.G., SEATED AT A TABLE)?
810

NO

CAUSE AN ELECTRONIC DEVICE OF THE SERVER TO OUTPUT THE RECOMMENDATION
814

CAUSE A USER INTERFACE TO PRESENT AN INTERACTIVE ELEMENT ASSOCIATED WITH THE TABLE WHERE THE CUSTOMER IS SEATED
816

RECEIVE AN INDICATION OF AN INTERACTION WITH THE INTERACTIVE ELEMENT
818

CAUSE THE USER INTERFACE TO PRESENT INFORMATION ABOUT THE CUSTOMER, THE INFORMATION INCLUDING THE RECOMMENDATION
820

FIG. 8

1000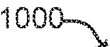

UPDATE A CUSTOMER PROFILE OF A CUSTOMER BEFORE, DURING, AND/OR AFTER A
VISIT TO A MERCHANT LOCATION
1002

ACCESS THE CUSTOMER PROFILE OF A CUSTOMER
1004

ACCESS ITEM AVAILABILITY DATA INDICATING WHETHER ITEMS ARE IN STOCK AT THE
MERCHANT LOCATION
1006

NOTIFY CUSTOMER
REGARDING A SHIPMENT OF A ITEM
PREFERRED BY THE CUSTOMER?
1008

NO

WAIT
1010

YES

SEND INVITATION TO THE CUSTOMER, THE INVITATION INDICATING THAT THE ITEM IS IN
STOCK AT THE MERCHANT LOCATION
1012

FIG. 10

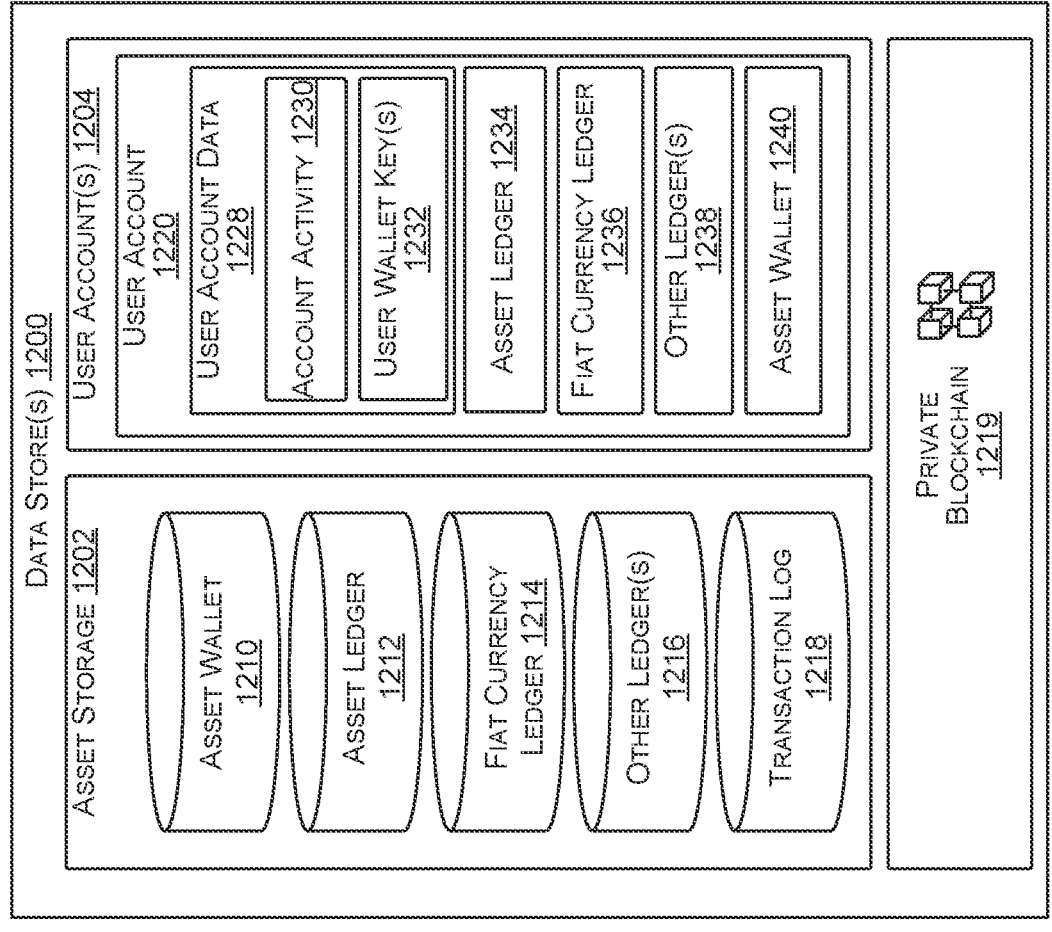
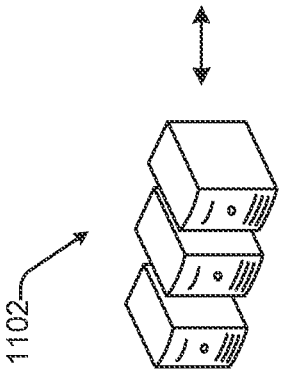
FIG. 12

DYNAMIC RECOMMENDATIONS BASED ON CUSTOMER PROFILES

TECHNICAL FIELD

Merchants that operate restaurants may offer dine-in, takeout, and/or delivery services to their customers. When visiting a full-service restaurant, a customer typically checks in with a host at the front of the restaurant and asks for a table. The host might use an application executing on a computing device to determine if any tables are available for the customer, and, if there are no tables currently available for the customer, the customer can choose to be added to a waitlist for the next available table, which is often managed by the application. Many restaurants also have their own, or utilize third-party, websites that allow customers to make reservations ahead of time to ensure that a table is ready when the customer arrives at the time of the reservation. When the customer is seated at a table, a server typically greets the customer and starts to take their order, sometimes using a computing device to enter the order information.

BRIEF DESCRIPTION OF THE DRAWINGS

Features of the present disclosure, its nature and various advantages, will be more apparent upon consideration of the following detailed description, taken in conjunction with the accompanying drawings.

FIG. 8 is an example process for implementing dynamic recommendations based on customer profiles, according to an implementation of the present subject matter.

FIG. 10 is an example process for sending an invitation to a customer based at least in part on a recent or upcoming shipment of an item preferred by the customer, according to an implementation of the present subject matter.

FIG. 12 is an example data store used for performing techniques described herein.

In the figures, the left-most digit(s) of a reference number identifies the figure in which the reference number first appears. The use of the same reference numbers in different figures indicates similar or identical items or features. The drawings are not to scale.

DETAILED DESCRIPTION

Figure 1:
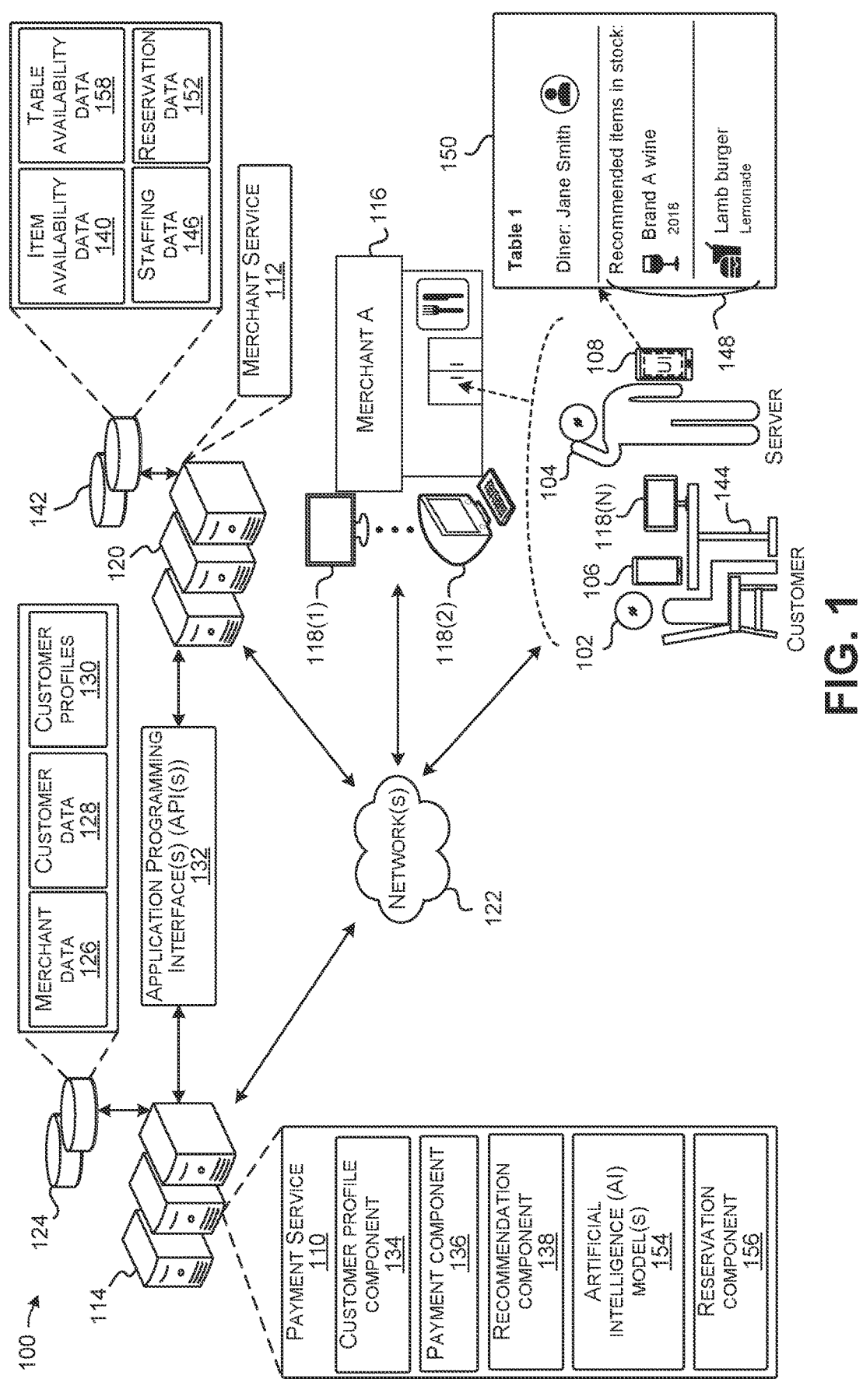
FIG. 1 is an example environment for implementing dynamic recommendations based on customer profiles, according to an implementation of the present subject matter.

Described herein are, among other things, techniques, devices, and systems for implementing dynamic recommendations based on customer profiles. In the examples described herein, a merchant may have one or more merchant locations (e.g., restaurants) that customers may visit to purchase items from the merchant. A plurality of such merchants may utilize a payment service to facilitate transactions with their customers (e.g., by the payment service processing payments made by customer for items purchased at various merchant locations). After obtaining consent from the customers and from the merchants, customer data and merchant data associated with various customer-merchant interactions may be collected overtime and used to build customer profiles. These customer profiles may include a rich suite of information about customers (e.g., past orders placed by customers, preferred items of customers, allergies and/or dietary restrictions of customers, etc.). Accordingly, these customer profiles can provide a robust understanding of any given customer and/or group of customers. The techniques, devices, and systems described herein provide a way of leveraging customer profiles in order to dynamically generate recommendations for customers. As used herein, "dynamically generating" a recommendation means using an automated process (e.g., artificial intelligence (AI)) to determine or generate the recommendation without user intervention, and in real-time or near real-time. Furthermore, by causing a generated recommendation to be output via an electronic device of a server (e.g., a waiter at a merchant location), a relevant server can be provided with relevant customer information (e.g., a recommendation(s) associated with an item(s) that is in stock at the merchant location) at a relevant time (e.g., a time at which the customer is at the merchant location). In general, the customer information that is accessible to the server via the customer profile allows the server to understand the customer(s) they are about to serve at the merchant location, and the recommendation(s) is a way for the server to provide the customer with a better customer experience at the merchant location.

In an example process for implementing dynamic recommendations based on customer profiles, a computing system may receive an identifier of a customer in association with a visit of the customer to a merchant location of a merchant, and the computing system may access a customer profile of the customer based at least in part on the identifier. In an illustrative example, in the process of adding the customer to a waitlist associated with the merchant location, the customer may have voluntarily provided their phone number to a host who is in charge of seating customers at tables at the merchant location. In this example, the customer's phone number may be used as a customer identifier, but it is to be appreciated that other types of customer identifiers may be received by the computing system and/or the customer identifier(s) may be received in other ways besides being provided by the customer for purposes of adding the customer to a waitlist, as described in more detail below with respect to the various implementations of the present subject matter. In the example process, the computing system may further access item availability data indicating whether items are in stock at the merchant location, and may generate a recommendation associated with an item that is in stock at the merchant location based at least in part on the customer profile and the item availability data. For example, the computing system may generate a recommendation for an item that the customer is likely to enjoy based on the customer profile of the customer, and, by verifying that this item is in stock at the merchant location, the recommendation can be provided to the customer knowing that the item is available at the merchant location for provisioning the item to the customer during their visit. In order for a relevant server to provide the recommendation to the customer at a relevant time, the example process may further include receiving, by the computing system, an indication that the customer is at the merchant location, and in response to the receiving of the indication, determining, by the computing system, a server (e.g., a waiter assigned to a table where the customer is seated), and causing, by the computing system, an electronic device of the server to output the recommendation.

The techniques, devices, and systems described herein allow merchants to provide an improved experience to customers who visit their merchant locations. Servers who serve customers at existing restaurants do not have a good understanding of who their customers are until the servers begin interacting with the customers. This gap in understanding leads to a suboptimal customer experience. For example, when the customer is seated at a table, the server may not know the customer's name, or their preferences, or their allergies and dietary restrictions. Understanding these things about a customer takes time; typically over the course of multiple interactions with the customer. In today's fast-paced society, interactions between servers and customers can be relatively quick, and it is becoming more difficult for servers to remember the customers they have served in the past. Restaurants often have high turnover with their staff as well, which means that a new server may not realize that they are serving a regular customer who frequents the restaurant. The techniques, devices, and systems described herein improve the experience of customers who visit merchant locations by providing relevant customer information to a relevant server who is serving, or is about to serve, a customer at a merchant location, which helps to close the aforementioned gap in understanding between the server and the customer. For example, the server may be issued a handheld electronic device that is configured to output, at a relevant time (e.g., when the customer has just been seated at their table at the merchant location), information about the customer, and this information can include one or more recommendations associated with one or more items that are in stock at the merchant location. In an illustrative example, upon a computing system receiving an indication that a customer has been seated at a server's table at a merchant location, the computing system may cause the server's handheld electronic device to output a recommendation for the customer's favorite wine, which has been confirmed to be in stock at the merchant location. Accordingly, the server can approach the customer who is seated at the table and say something like "Welcome Jane, my name is Beth and I'll be serving you today. We have a bottle of [Brand A wine] in the cellar, can I get you started with a glass while you look over the menu?" In this example, the customer experience is improved by the server knowing the customer's name and favorite wine in advance of approaching the customer, and by the server proactively offering the customer a glass of their favorite wine during the initial few seconds of their interaction with the customer.

The techniques, devices, and systems described herein allow for surfacing customer recommendations in a timely, and contextually relevant manner. In other words, a recommendation(s) for a customer is/are output via a device of a server at a merchant location within a threshold time of an event (e.g., in response to, and within a threshold time of, receiving an indication that a customer is at a merchant location). The techniques, devices, and systems for using customer profiles to make time-sensitive recommendations to customers addresses the challenges of alerting the relevant server with time-sensitive information in the context of serving a customer at a merchant location, such as by alerting a server regarding a recommendation for a customer as soon as the customer is seated at a table to which the server is assigned. That is, by outputting time-sensitive recommendations via an electronic device of the relevant server in association with an event (e.g., a customer being located at a merchant location where the server is working), the server can take proactive measures to enhance the customer's experience at the merchant location.

The techniques, devices, and systems described herein result in an improved user interface for electronic devices. Servers who serve customers at existing restaurants typically don't have access to any information about the customers they are serving, and even in instances where they do, a server might receive a paper chit (a small receipt with customer information printed thereon) from a host when the customer is being seated, but a paper chit includes limited and fixed information about a customer that is sometimes difficult to read (e.g., when ink in a printer is running low), and the chit can be easily dropped and/or misplaced. Conventional user interfaces for accessing customer information require users (e.g., the servers) to navigate through a series of user interfaces and complete a multitude of steps, such as logging into a database, looking up a customer by entering a customer's name or another customer identifier, clicking through a series of user interfaces to obtain the information they are looking for, and the like. Such user interfaces make user interactions with electronic devices inefficient (e.g., users must remember their login credentials, click through a multitude of pages, complete a multitude of steps, etc.). The techniques, devices, and systems described herein cause a user interface of an electronic device of a server to present time-sensitive information about a customer—including a recommendation(s) associated with an item(s) that is/are in stock at the merchant location where the server is serving the customer, which makes it quick and easy for the server to understand the customer with minimal user interaction with the electronic device. For example, the user interface output via the electronic device of the server may present an interactive element associated with a table where a customer is seated, and upon interacting with the interactive element, the user interface may present relevant customer information (e.g., a recommendation(s) associated with an available item(s)). This improved user interface addresses problems with efficiency of using electronic devices, particularly those with small screens (e.g., mobile phones, tablets, and similar handheld electronic devices). By providing a server with a streamlined, simple user interface to consume relevant information about a customer they are about to serve, the server can more efficiently access relevant information about the customer they are serving, especially when accessing the information on an electronic device with a small form factor (e.g., a mobile phone). In the examples described herein, a recommendation(s) for a customer is often described as being output via an electronic device of a server (e.g., a waiter at a merchant location), but it is to be appreciated that the recommendation(s) can be output via other devices. For example, the recommendation(s) may be output via one or more electronic devices at a merchant location in lieu of, or in addition to, the server's electronic device, such as a fixed device (e.g., a tablet) located at a table where the customer is seated, a device (e.g., a tablet) that is movable between tables at the merchant location, an electronic device of the customer (e.g., the customer's mobile phone), or the like. For instance, the customer may use their own electronic device to scan an element (e.g., a Quick Response (QR) code) at the merchant location, and, in response, the customer's device may output a menu of items available for purchase at the merchant location along with a recommendation(s) for the customer.

Also described herein are techniques, devices, and systems for dynamically determining time slots for reservations made by customers at merchant locations. Traditional reservation systems use a slot-booking model with static inventory. For example, when a customer makes a reservation using a conventional reservation system, a table at the merchant location where the reservation is being made is blocked for two hours starting at the time of the reservation. These static, predetermined time slots are applied uniformly to all customers who make reservations at the merchant location. With this conventional slot-booking model, a customer may not stay for the full amount of time that was blocked for their reservation, and in this scenario, the merchant is left with an empty table that is not being used at all, unless a waiting customer can be quickly served at the table before the start time of the next reservation, which typically results in a waste of resources if a customer cannot be "squeezed in" or a poor dining experience for the customer who is "squeezed in." The techniques, devices, and systems described herein provide a way of dynamically determining and assigning time slots for reservations made by customers at a merchant location based at least in part on the customer profile of the customer and table availability data that indicates at least past availability of tables at the merchant location. For example, if the customer profile of a customer who has requested to make a reservation at a merchant location indicates that the customer is a relatively fast diner, and/or if the customer is reserving a table for two (as opposed to a large group), and/or if the reservation is being made for a day and a time of day that is typically not busy and/or a time when the merchant location will be fully staffed, the customer's reservation may be made for a shorter-than-typical time slot (e.g., a time slot of about an hour instead of the typical fixed, predetermined block of time that is uniformly ascribed to all reservations in the above-mentioned slot booking model of conventional reservation systems). This allows for more efficient utilization of resources, such as tables, at the merchant location. In other words, with dynamically-determined time slots for reservations, the time slots are better catered to the customers making those reservations, and a table can be made ready for the next customer shortly after a diner finishes at the table, for example, so that the table does not remain empty or unused for a significant period of time. Moreover, overlapping reservations can be mitigated by ascribing relatively long time slots to relatively slow diners, and/or to reservations made for large diner groups at relatively busy times and/or when the merchant location is understaffed.

In some examples, resource utilization can be optimized by determining dynamic time slots for customers on a waitlist, as those customers are removed from the waitlist to be seated at tables at a merchant location. For example, a customer on a waitlist may have provided their phone number or another customer identifier, which is used by a computing system to access a customer profile of the customer. Once a table opens up for the customer, the time slot for which the table is made unavailable while the customer dines at the merchant location may be dynamically determined based at least in part on the customer profile and the table availability data indicating at least past availability of tables at the merchant location, as described above. In this manner, if the customer profile of the customer indicates that the customer is a relatively fast diner, the table at which the customer is seated can be rendered unavailable to other customers for a shorter-than-typical time slot. In some examples, once a time slot it determined, the time slot can be adjusted based on any suitable data and/or criteria, such as staffing data indicating the staffing capacity at a merchant location is at a certain level. For example, if staffing data indicates that a merchant location is, or will be, understaffed (e.g., if several workers called in sick and/or kitchen capacity is limited on the day of the customer's visit to the merchant location), the time slot may be adjusted (e.g., by extending the end time) to account for the merchant location being understaffed.

The techniques, devices, and systems described herein may optimize resource utilization by recommending items with a shorter shelf life over items with a longer shelf life. For example, when a recommendation(s) for a customer is output on an electronic device of a server who is assigned to the table where the customer is seated, the recommendation(s) may be skewed towards recommending items that have a shorter shelf life than other items that might otherwise be recommended for the customer (e.g., the system may recommend items that are sooner to expire than other items that would otherwise be recommended for the customer and/or that are more perishable than other items that would otherwise be recommended for the customer). In this way, items are optimally utilized at the merchant location (e.g., inventory that is close to expiration may be moved off the shelf quicker than items that are less perishable or have a longer shelf life).

The techniques, devices, and systems described herein allow one or more devices to conserve resources with respect to processing resources, memory resources, networking resources, power resources, etc., in the various ways described herein. For example, with the techniques described herein, a server (e.g., a waiter at a merchant location) does not have to spend time clicking through numerous user interfaces to determine relevant information (e.g., recommendations) about a customer they are about to serve. Instead, the techniques described herein cause a user interface(s) with a recommendation(s) for a customer to be presented to a server in context (e.g., when the customer is at the merchant location) so that the server can understand the customer with minimal user interaction with their electronic device. In this manner, the software (and, more generally, the server's electronic device) does not have to display needless user interfaces while the server scours through a database looking for relevant information about the customer they are about to serve, which, in turn, conserves resources associated with such scouring activity (e.g., resources of the server's electronic device that are used to display those user interfaces, cloud resources that process database hits each time a new user interface is displayed on the server's electronic device, etc.). As another example, with the techniques described herein for dynamically determining time slots for reservations made by customers at merchant locations, resources associated with canceling, adjusting, and/or making new reservations at a merchant location can be conserved by mitigating instances of overlapping reservations, and/or by mitigating instances of empty or unused tables. That is, by dynamically determining time slots for reservations at a merchant location, reservations are more likely to be, and remain, suitable for efficiently moving customers through a restaurant on a given day whilst mitigating instances of tables being empty or unused for a significant period of time, and/or whilst mitigating instances of overlapping reservations. This, in turn, conserves resources associated with canceling, adjusting, and/or making new reservations at a merchant location (e.g., cloud resources used by a merchant's reservation system to make reservations for customers).

The preceding summary is provided for the purposes of summarizing some example embodiments to provide a basic understanding of aspects of the subject matter described herein. Accordingly, the above-described features are merely examples and should not be construed as limiting in any way. Other features, aspects, and advantages of the subject matter described herein will become apparent from the following description of the Figures and Claims.

FIG. 1 is an example environment 100 for implementing dynamic recommendations based on customer profiles, according to an implementation of the present subject matter. As depicted, the example environment 100 may include users, such as a customer 102 (e.g., a diner) and a server 104 (e.g., a waiter). The customer 102 may be associated with one or more electronic devices 106, and the server 104 may be associated with one or more electronic devices 108. The electronic devices 106, 108 may be configured to execute browsers and/or applications thereon. In some examples, respective browsers and/or applications, when executing on the electronic devices 106, 108, may allow these users 102, 104 to interact with or access services, such as a payment service 110 and/or a merchant service 112. In some examples, user interfaces may be displayed (e.g., via browsers, applications, etc.) on the displays of the respective user's devices 106, 108 to implement the techniques described herein, and the users 102, 104 can interact with those user interfaces, as described in more detail below.

In some examples, a service provider of the payment service 110 may implement a computing platform 114 (hereinafter, a "payment service computing platform" 114) that, among other things, is configured to process payments on behalf of merchants to allow the merchants to conduct transactions with customers. For example, the customer 102 (e.g., a diner) may visit a merchant location 116 (e.g., a restaurant) of a particular merchant, and, during the visit, the customer 102 can make a payment to the merchant (e.g., for an item(s) purchased, such as a meal purchased and consumed, by the customer 102 at the merchant location 116, for service(s) provided to the customer 102 at the merchant location, etc.). This payment can be made using a payment application executing on the customer's device 106 and/or a payment instrument (e.g., a credit card, a debit card, a prepaid card, a gift card, etc.), and the payment service computing platform 114 may be configured to process the payment for the merchant associated with the merchant location 116. In some examples, electronic devices 118(1) to 118(N) (collectively 118) at the merchant location 116 may include point-of-sale (POS) terminals, card readers, or the like, which may facilitate transactions between customers and merchants. In some examples, the electronic devices 118 are provisioned by the service provider of the payment service 110 to the merchants to use at their merchant locations (e.g., the merchant location 116) to facilitate transactions with customers (e.g., the customer 102). FIG. 1 also depicts a computing platform 120 that may be owned, operated, or otherwise utilized, by a particular merchant in order to implement the merchant service 112. The merchant service 112 may represent one or more services provided by the merchant, such as an ordering service that processes orders made online or on premise by customers, a reservation service for making reservations at the merchant location 116, a waitlist service for implementing a waitlist associated with the merchant location 116, etc.).

As depicted by FIG. 1, the electronic devices 106, 108, 118, the server(s) 114, and the server(s) 120 may be communicatively coupled via one or more network(s) 122, such as a wide area network (WAN) (e.g., the Internet, a cellular network, etc.). In some examples, the server(s) 114 and/or the server(s) 120 may include a cloud-based computing architecture suitable for hosting and servicing sessions and/or applications that implement the techniques described herein. In particular examples, the server(s) 114 and/or the server(s) 120 may include a Platform as a Service (PaaS) architecture, a Software as a Service (SaaS) architecture, an Infrastructure as a Service (IaaS), a Data as a Service (DaaS), a Compute as a Service (CaaS), or other similar cloud-based computing architecture (e.g., "X" as a Service (XaaS)).

The server(s) 114 and the server(s) 120 may be configured to provide processing or computing support for the payment service 110 and the merchant service 112, respectively. The server(s) 114 may have access to one or more data stores 124. The data store(s) 124 may include, for example, one or more internal data stores that may be utilized to store data associated with customers and/or merchants. For example, as shown in FIG. 1, the data store(s) 124 may be used to maintain merchant data 126, customer data 128, and/or customer profiles 130, among other data and/or data structures described herein. After obtaining consent from customers (e.g., the customer 102) and from merchants, the customer data 128 and/or the merchant data 126 associated with various customer-merchant interactions and/or user input provided by customers and/or merchants (e.g., servers 104) may be collected over time and used (e.g., by a customer profile component 134 of the payment service 110) to build the customer profiles 130. The merchant data 126 and/or the customer data 128 may be collected via any suitable electronic device or combination of devices, such as the electronic devices 106, 108, 118 depicted in FIG. 1. In some examples, the server(s) 120 may collect merchant data 126 and/or customer data 128, and the payment service computing platform 114 may utilize one or more application programming interfaces (APIs) 132 to collect some or all of the merchant data 126 and/or the customer data 128 from the server(s) 120.

The customer profiles 130 may represent data structures that include a rich suite of information about customers, which can provide a robust understanding of any given customer 102 and/or group of customers. In some examples, a customer profile 130 for an individual customer 102 may include a name of the customer 102, an image (e.g., picture) of the customer 102, merchant locations visited by the customer 102, preferences of the customer 102 (e.g., items preferred, seating preferences, such as whether the customer 102 prefers sitting outside, inside, at the bar, etc.), the customer's 102 likes and/or dislikes about particular merchant locations and/or services provided at the merchant locations, a transaction history of the customer 102 (e.g., orders placed, items purchased, times at which orders were placed and/or items were purchased, transaction amounts, where the orders were placed and/or where the items were purchased, mechanisms used to place orders and/or purchase items (e.g., online, on premise via a POS device, a payment application executing on the customer's device 106, etc.), or the like), a visitation history of the customer 102 (e.g., times and/or durations of past visits by the customer 102 to one or more merchant locations), allergies and/or dietary restrictions of the customer 102, the customer's 102 status with a particular merchant and/or merchant location (e.g., whether the customer 102 is a very important person (VIP), a friends and family member, a regular, a rewards member, a loyalty member, etc.), events (e.g., birthdays, anniversaries, etc.) associated with the customer 102, payment methods (e.g., card on file, payment application, etc.) used by the customer 102, or the like. Some or all of this information may be provided by the customer 102 via user input (e.g., the customer 102 may fill out an electronic form and/or survey to create at least part of the customer profile 130) and/or some or all of the information may be determined from customer data 128 collected by one or more of the aforementioned electronic devices 106, 108, 118 at any suitable time (e.g., prior to, during, and/or after a visit of the customer 102 to a merchant location 116). For example, when the customer 102 pays for a meal at the merchant location 116 using a payment application executing on their electronic device 106, a payment component 136 of the payment service 110 may process the payment and may store, in the data store 124, the customer data 128 regarding the payment method used, which may be used to update (e.g., populate) the customer profile 130 of the customer 102 with the payment method used and/or other attributes of the payment (e.g., day of the payment, time of day of the payment, transaction amount, etc.). In some examples, and as described in more detail below, the customer profiles 130 may include group profiles associated with two or more customers.

Figure 2:
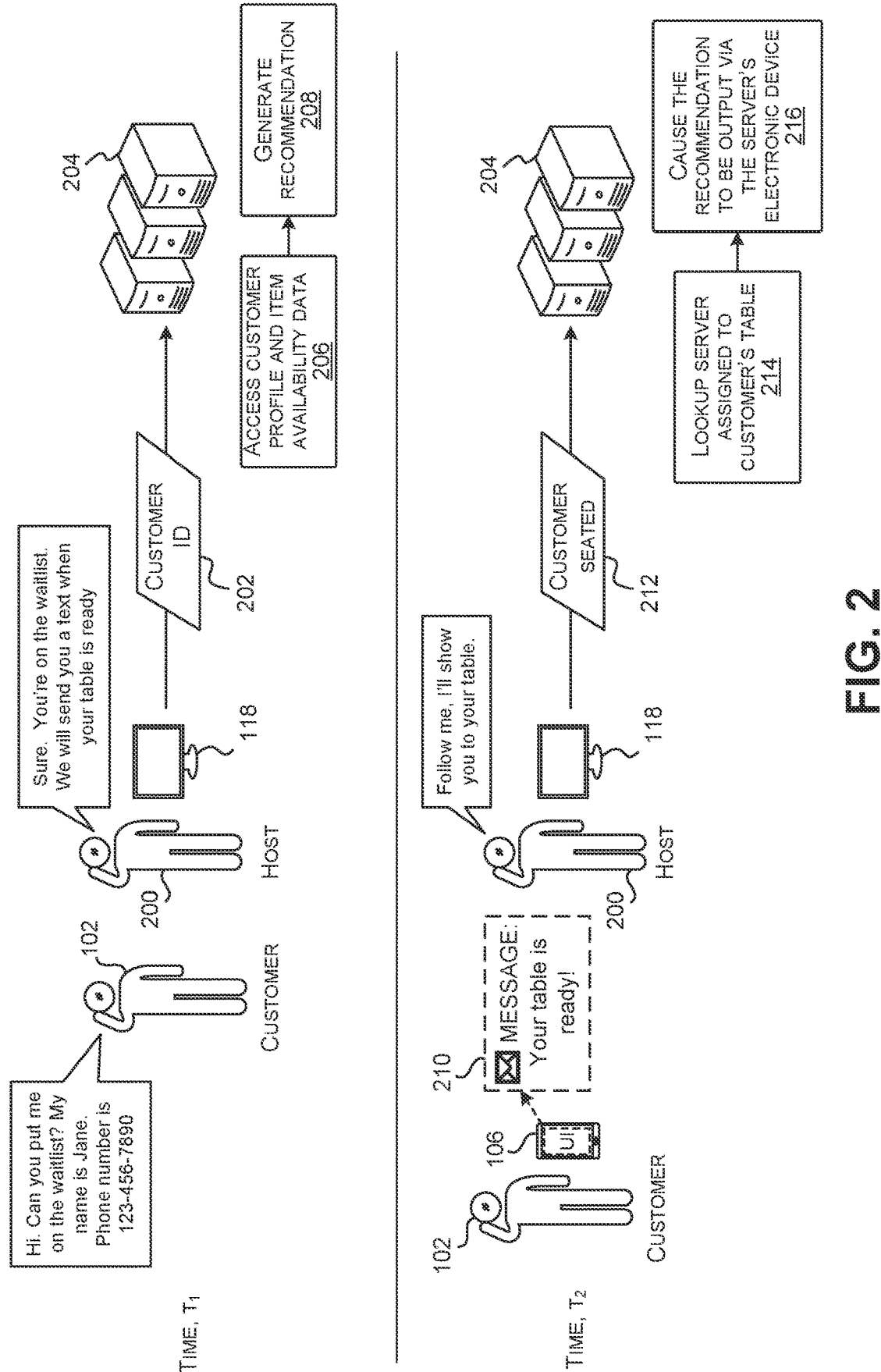
FIG. 2 is an example diagram illustrating a technique for causing an electronic device of a server assigned to a table at a merchant location to output a recommendation for a customer who has been seated at the server's table, according to an implementation of the present subject matter.

The customer profiles 130 can be leveraged using the techniques, devices, and systems described herein in order to dynamically generate recommendations for customers, such as the customer 102, and to do so in a contextual manner. For example, the techniques, devices, and systems described herein allow for providing a relevant server 104 (e.g., a waiter) at a merchant location 116 with relevant customer information (e.g., recommendation(s) associated with an item(s) that is in stock at the merchant location 116) at a relevant time (e.g., a time at which the customer 102 is at the merchant location 116). This allows the relevant server 104 to understand the customer(s) 102 they are about to serve at the merchant location 116. To illustrate, consider the example of FIG. 2, where, at time, $T_1$, the customer 102 visits the merchant location 116 (e.g., a restaurant) and asks to be added to a waitlist for a table at the merchant location 116. For example, the customer 102, at time, $T_1$, may approach a host 200 at the front (e.g., in the lobby) of the merchant location 116 and say something like "Hi. Can you put me on the waitlist?My name is Jane. Phone number is 123-456-7890." The host 200 may enter the customer's 102 name (e.g., a full name, if provided by the customer 102) and/or the customer's 102 phone number via an electronic device 118 (e.g., via an application executing on the device 118, the application implementing a waitlist associated with the merchant location 116). Upon entering the customer information via the electronic device 118, the host 200 may reply verbally to the customer 102 by saying something like "Sure. You're on the waitlist. We will send you a text when your table is ready." The customer's name and/or phone number, in this example, may be used as a customer identifier (ID) 202, although these are merely examples of a customer ID 202 and other types of customer IDs may be utilized. In the example of FIG. 2, the electronic device 118 of the host 200 may send the customer ID 202 to a computing system 204. The computing system 204 shown in FIG. 2 may represent the server(s) 120, the server(s) 114, and/or another electronic device 118 at the merchant location 116 (e.g., another computer(s) located on premise at the merchant location 116). Based at least in part on the customer ID 202, the computing system 204 may, at block 206, access a customer profile 130 of the customer 102. Customer profiles 130 may be indexed in the data store(s) 124 by customer ID 202 (e.g., the customer's 102 name, phone number, etc.). The customer profile component 134 (See FIG. 1) may access the customer profile 130 at block 206 based on the received customer ID 202. The customer profile component 134 may also provide the customer profile 130 to a recommendation component 138 of the payment service 110 for purposes of generating a recommendation(s) for the customer 102 at block 208. At block 206 of FIG. 2, the computing system 204 may also access item availability data 140 indicating whether items are in stock at the merchant location 116. This item availability data 140 may be maintained in a data store(s) 142 accessible to the server(s) 120, for example. The data store(s) 142 may include, for example, one or more internal data stores that may be utilized to store data associated with customers and/or merchants, such as data regarding specific merchant locations (e.g., the merchant location 116). In some examples, the recommendation component 138 may access the item availability data 140 from the data store(s) 142 via the API(s) 132 and may utilize the item availability data 140 to ensure that recommendations generated for the customer 102 are for items that are in stock at the merchant location 116. This avoids, or at least mitigates, instances where a recommendation is made for an item that is out-of-stock at the merchant location 116. Accordingly, as shown at block 208 of FIG. 2, the computing system 204 (e.g., the recommendation component 138) may generate a recommendation(s) associated with an item(s) that is in stock at the merchant location 116 based at least in part on the customer profile 130 and the item availability data 140. In an example, the recommendation(s) generated at block 208 may be for an in-stock item(s) that is preferred by the customer 102 based at least in part on the customer profile 130 indicating that the customer 102 prefers the item(s), and based at least in part on the item availability data 140 indicating that the item(s) is/are in stock at the merchant location 116.

As shown in FIG. 2, at time, $T_2$, the customer 102 may receive a notification that that their table is ready. In the example of FIG. 2, the notification is a text message received via the electronic device 106 of the customer 102 and presented via a user interface 210 of the device 106 (e.g., a text message that reads "Your table is ready!"). The customer 102 can approach the host 200 to let them know that they received a notification that their table is ready, and the host 200 may determine, from information presented by the application executing on the device 118, a particular table

144 at the merchant location 116 where the customer 102 is to be seated. The host 200 may say something like "Follow me, I'll show you to your table," and the customer 102 and the host 200 may start walking to the table 144 where the customer 102 is to be seated. Meanwhile, the electronic device 118 of the host 200 may have already sent, to the computing system 204, an indication 212 that the customer 102 has been seated at the designated table 144, or that the customer 102 is otherwise at the merchant location 116. In response to the receiving of the indication 212, the computing system 204 (e.g., the recommendation component 138) may, at block 214, determine (e.g., lookup) a server 104, such as a server 104 assigned to the table 144 where the customer 102 has been seated. In some examples, the determining of the server 104 may include accessing staffing data 146 from the data store(s) 142 (e.g., via the API(s) 132), and looking up an ID of the table 144 in the staffing data 146 to determine the server 104 assigned to the table 144 for the day and time that the customer 102 is seated at the table 144. At block 216 of FIG. 2, the computing system 204 (e.g., the recommendation component 138), may cause an electronic device 108 of the server 104 to output the recommendation(s) generated at block 208. FIG. 1 illustrates an example of a recommendation(s) 148 that is/are output (e.g., displayed) via the electronic device 108 of the server 104. In this example, the electronic device 108 of FIG. 1 is shown as outputting (e.g., displaying) multiple recommendations 148 including a first recommendation for the customer's 102 favorite wine (e.g., Brand A wine) and a second recommendation for a meal (e.g., a lamb burger and a lemonade). In some examples, one or more of these recommended items may be preferred by the customer 102, according to the customer profile 130 of the customer. Furthermore, these items (e.g., Brand A wine, the lamb burger, and the lemonade) were confirmed to be in stock at the merchant location 116 based at least in part on the item availability data 140. In the example of FIG. 1, the recommendation(s) 148 is/are shown as being output (e.g., presented) via a user interface 150 of the electronic device 108 of the server 104. In some examples, the user interface 150 may present additional information about the customer 102 seated at the table 144, such as the customer's 102 name, an image of the customer 102, allergies and/or dietary restrictions of the customer 102, or the like. In this way, the server 104 already knows the customer's 102 name and one or more of the customer's 102 favorite items in advance of approaching the customer 102 at the table 144, and the server 104 can greet the customer 102 by their name and proactively offer the customer 102 one or more of their favorite items (e.g., a glass of their favorite brand of wine) during the initial few seconds of their interaction with the customer 102, which provides an improved customer experience, as compared to conventional restaurants where there is often a gap in understanding between the server and the customer at the time of the initial interaction.

Although the recommendation(s) 148 is/are shown as being output (e.g., presented) via a user interface 150 of the electronic device 108 of the server 104 in the example of FIG. 1, it is to be appreciated that the recommendation(s) 148 for the customer 102 can be output via other devices. For example, the recommendation(s) 148 may be output via one or more electronic devices at the merchant location 116 in lieu of, or in addition to, the server's electronic device 108, such as a device 118(N) (e.g., a tablet)—which may be fixed or movable located at a table 144 where the customer 102 is seated, an electronic device 106 of the customer 102 (e.g., the customer's mobile phone), or the like. For instance, the customer 102 may use their own electronic device 106 to scan an element (e.g., QR code) at the merchant location 116, and, in response, the customer's device 106 may output a menu of items available for purchase at the merchant location 116 along with a recommendation(s) 148 for the customer 102.

Figures 3A, 3B:
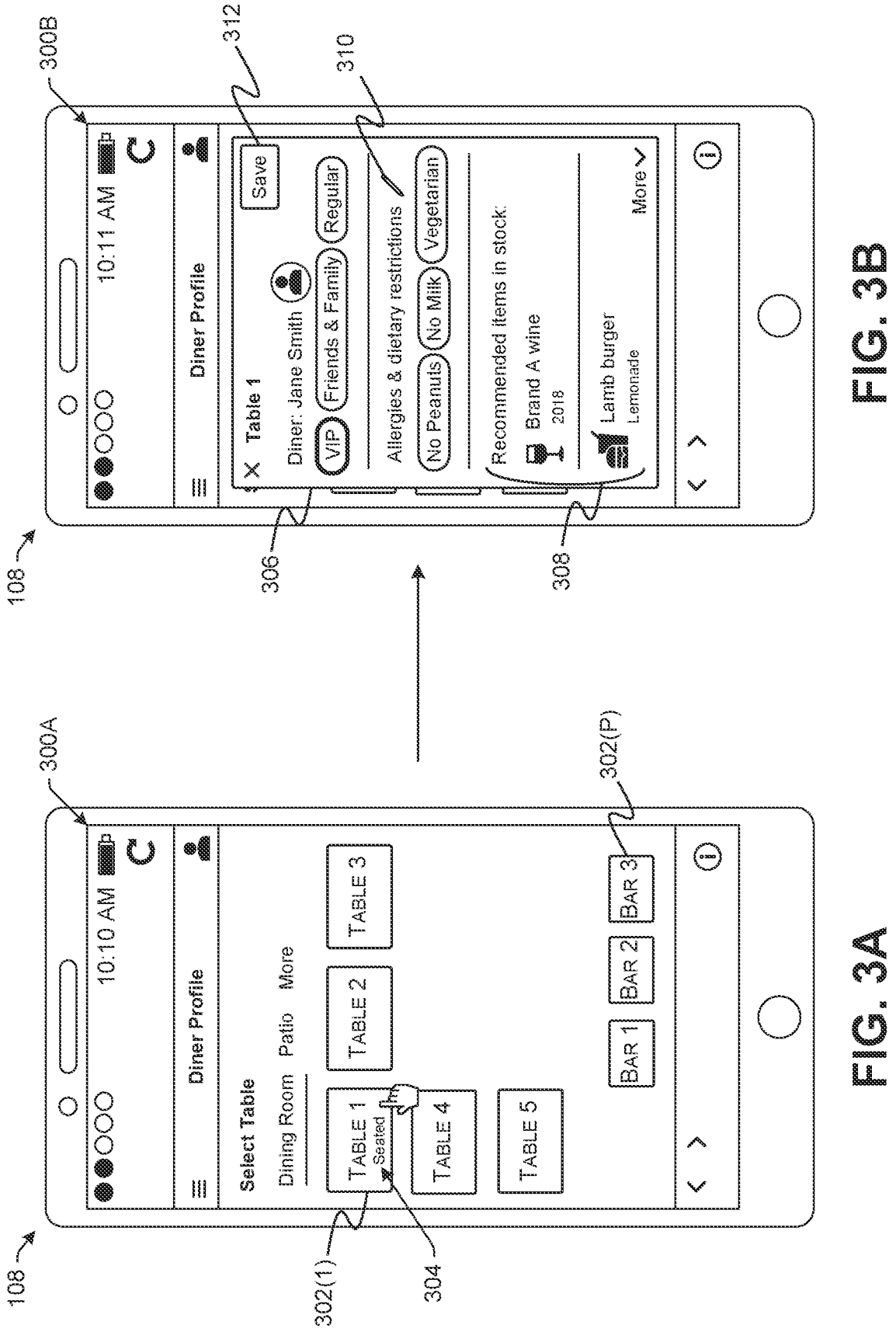
FIGS. 3A and 3B illustrate example user interfaces for presenting a dynamic recommendation(s) based on a customer profile, according to an implementation of the present subject matter.

FIGS. 3A and 3B illustrate example user interfaces 300 for presenting a dynamic recommendation(s) based on a customer profile 130, according to an implementation of the present subject matter. In some examples, the user interface 300B of FIG. 3B is a more-detailed representation of the user interface 150 shown in FIG. 1. With initial reference to FIG. 3A, a computing system (e.g., the computing system 204) may cause the user interface 300A to be presented on an electronic device 108 of a server 104 (e.g., a waiter) at a merchant location 116 at any suitable time. In some examples, the user interface 300A is presented by an application executing on the electronic device 108. In some examples, the user interface 300A is presented by a browser, such as a web browser. The example user interface 300A of FIG. 3A depicts a "Diner Profile" that is configured to help the server 104 understand customers (e.g., diners) at the merchant location 116 with minimal user interaction with the device 108. For example, the user interface 300A may present one or more interactive elements 302(1) to 302(P) (collectively 302) associated with tables at the merchant location 116. In the example of FIG. 3A, the user interface 300A presents multiple interactive elements 302 associated with respective tables in a dining room of the merchant location 116. In some examples, the user interface 300A may be configured to receive a selection of a particular area (e.g., room) of the merchant location 116, such as a dining room, a patio, etc. that, upon selection, presents interactive element(s) 302 associated with the table(s) in the selected area (e.g., room). In the example of FIG. 3A, the server 104 has selected the "dining room" and, in response to this selection, the interactive elements 302(1) to 302(P) associated with respective tables in the dining room of the merchant location 116 are presented via the user interface 300A.

The server 104 may be assigned to a subset of tables at the merchant location 116, such as Tables 1 to 5 in the dining room of the merchant location 116. Accordingly, the user interface 300A may be configured to present at least the interactive elements 302 that are associated with Tables 1 to 5 for the server 104 to interact with because the server 104 is assigned to those tables. In some examples, interactive elements 302 associated with tables to which the server is not assigned may be presented as elements that are not interactable for the specific server 104, or those interactive elements 302 may not be presented via the user interface 300A for the specific server 104. With continued reference to the example shown in FIG. 2, as soon as the customer 102 is seated at a table 144 and/or as soon as the computing system 204 receives the indication 212, a notification may be provided to the server 104, such as a push notification. In the example of FIG. 3A, a notification 304 is provided to the server 104 in the form of a visual indication (e.g., the text "seated") that appears (e.g., is presented) within the interactive element 302(1), the visual indication indicating that a customer 102 has been seated at a table 144 to which the server 104 is assigned (e.g., Table 1). In this manner, in response to the computing system 204 receiving the indication 212, the server 104 is notified that a customer 102 has been seated at their table 144. The server 104 can then interact with (e.g., select) the interactive element 302(1) associated with the table 104 to view more information about the customer 102 seated at their table 144. It is to be appreciated that other types of notifications, such as a text message, a pop-up (e.g., banner) notification, or the like can be implemented to notify the server 104 that a customer has been seated at their table.

The user interface 300B of FIG. 3B may be presented on the electronic device 108 in response to receiving an indication of an interaction with the interactive element 302(1) of FIG. 3A. In some examples, the user interface 300B represents the user interface 300A, but with a "guest tab" 306 presented over the information shown in the user interface 300A of FIG. 3A. For example, the guest tab 306 may "pop-up" in response to detecting the interaction with (e.g., selection of, a voice command relating to, etc.) the interactive element 302(1). The guest tab 306 presented in the user interface 300B may present information about the customer 102 seated at the table 144 (e.g., Table 1) to which the server 104 is assigned, such as the customer's 102 name, an image of the customer 102, the customer's 102 status with the particular merchant and/or merchant location 116 (e.g., whether the customer 102 is a VIP, a friends and family member, a regular, a rewards member, a loyalty member, etc.), allergies and/or dietary restrictions of the customer 102, and/or a recommendation(s) 308 associated with an item(s) that is in stock at the merchant location 116, or the like. In some examples, the recommendation(s) 308 of FIG. 3B may represent the recommendation(s) 148 shown in FIG. 1. In an example, the recommendation(s) 308 is for an item(s) that is preferred by the customer 102, as indicated in the customer profile 130 of the customer 102. In some examples, the guest tab 306 and/or the user interface 300B is configured to allow the server 104 to edit (e.g., add, change, delete, etc.) information associated with the customer 102. For example, an edit icon 310 may be interacted with (e.g., selected) to edit information regarding allergies and/or dietary restrictions of the customer 102. Additional edit icons like the edit icon 310 may be presented in association with other aspects of the guest tab 306 in order to edit additional/other customer information. After editing the information about the customer 102, the server 104 may interact with (e.g., select) a save element 312 (e.g., button), which causes the customer profile 130 of the customer 102 to be updated in the data store(s) 124 with the edited information. To illustrate, the customer 102 may tell the server 104 that they are allergic to shellfish, and the server 104 may add this allergy to the customer profile 130 of the customer 102 via the user interface 300B, such as by interacting with (e.g., selecting) the edit icon 310, then adding the allergy, and selecting the save element 312.

Notably, the user interface 300B is configured to present time-sensitive information about a customer 102—including a recommendation(s) 308 associated with an item(s) that is/are in stock at the merchant location 116 where the server 104 is serving the customer 102 at a particular time on a particular day. The recommendation(s) 308 presented via the user interface 300B helps the server 104 quickly understand the customer 102 with minimal user interaction with the electronic device 108. For example, upon interacting with the interactive element 302(1), the user interface 300B presents relevant customer information (e.g., a recommendation(s) 308 associated with an available item(s)), which addresses problems with efficiency of using electronic devices 108, particularly those with small screens (e.g., mobile phones, tablets, and similar handheld electronic devices). The user interface 300B is particularly useful in the service industry for workers who are often extremely busy serving customers and, therefore, have very little time to spend interacting with electronic devices. By providing a server 104 with a streamlined, simple user interface 300B to consume relevant information about a customer 102 they are about to serve, the server 104 can more efficiently access relevant information about the customer 102, especially when accessing the information on an electronic device 108 with a small form factor (e.g., a mobile phone) in a busy environment that is commonplace in the service industry.

In an illustrative use case, a server 104 might carry an electronic device 108 with them as they move about a merchant location 116. The server 104 may view the user interface 300A on their device 108 (e.g., after opening an application executing on the device 108) and see the notification 304 indicating that a customer 102 has been seated at their table 144. The server 104 may "tap" on an interactive element 302(1) associated with the table 144, and the user interface 300B may be presented on the electronic device 108 responsive to an indication of the interaction of the server 104 with the interactive element 302(1). For example, the user interface 300B may present the guest tab 306, which can indicate, among other things, the customer's name 102, an image of the customer 102, the customer's 102 allergies and/or dietary restrictions, and/or a recommendation(s) 308 associated with an item(s) that is in stock at the merchant location 116. The server 104 accesses this information via a single tap of the interactive element 302(1), and the server 104 can then approach the customer 102 seated at the table 144, identify the customer 102 from the image of the customer 102 presented via the user interface 300B, greet the customer 102 by their name, and/or offer the customer 102 one of their favorite items according to the recommendation(s) 308.

In the example above, the customer 102 provided their name and/or phone number to be added to a waitlist for a table at a merchant location 116, and the customer's 102 name and/or phone number served as an ID 202 of the customer 102 that was used to lookup the customer profile 130 of the customer 102. However, as mentioned above other types of customer IDs 202 may be received by a computing system 204 and/or the customer ID(s) 202 may be received in other ways besides being provided by the customer 102 for purposes of adding the customer 102 to a waitlist. For example, a customer 102 at a merchant location 116 may use their electronic device 106 to scan an element (e.g., a code, such as a Quick Response (QR) code) located at a table 144 at the merchant location 116, and an ID of the device 106 and/or an ID of an application executing on the device 106 may be received by the computing system 204 in response to the device 106 scanning the element (e.g., QR code), for example using a camera(s) of the device 106. In this example, the ID of the device 106 and/or the ID of the application executing thereon may be used as the customer ID 202 for purposes of accessing the customer profile 130 of the customer. In some examples, a different customer ID 202 stored in memory of the device 106 may be retrieved and sent to the computing system 204 in response to the device 106 scanning the element (e.g., QR code). Additionally, or alternatively, the scanning of the element (e.g., QR code) using the device 106 may cause a customized menu (e.g., a menu of items available for purchase at the merchant location 116 that is customized for the customer 102) to be presented on the device 106 so that the customer 102 can order one or more items that are then delivered to the customer 102 at the table 144 by the server 104. In some examples, an element (e.g., a QR code) is located elsewhere at the merchant location 116, such as an element located in the lobby, an element on a sign at the entrance to the merchant location 116, or the like. In some examples, an element (e.g., a QR code) is presented on a display of a POS device 118 at the merchant location 116. In these examples, the customer 102 can scan the element (e.g., QR code), sign in as a loyalty member based on the scanning of the element, and/or place an order for an item(s) in advance of being seated based on the scanning of the element. Meanwhile a customer ID 202 can be sent to, and received by, a computing system 204 based on the scanning of the element, and the customer ID 202 can be used to access a customer profile 130 of the customer 102, which, in turn, is used to inform the server 104 about the customer 102 when the customer 102 is eventually seated at a table 144 to which the server 104 is assigned. In some examples, the customer 102 may cause an element (e.g., a QR code) to be presented on a display of their electronic device 106 when the customer 102 is at the merchant location 116. In these examples, the element (e.g., QR code) may be associated with the customer 102 and used to identify the customer 102. For example, a server 104 may use their electronic device 108 to scan the customer's 102 element (e.g., QR code) while the element is displayed on the device 106, which causes a computing system 204 to receive a customer ID 202 that is used to access a customer profile 130 of the customer 102, which, in turn, is used to inform the server 104 about the customer 102.

In some examples, the customer 102 may have given permission for a merchant to apply a geofence to the electronic device 106 of the customer 102 (e.g., via an application associated with the merchant that is executing on the electronic device 106 of the customer 102). Accordingly, if the customer 102 carries their device 106 within a threshold distance of a merchant location 116 of the merchant, the device 106 may send a customer ID 202 to a computing system 204, which is used by the computing system 204 to access a customer profile 130 of the customer 102, and if the customer 102 is eventually seated at a table 144 at the merchant location 116, the server 104 assigned to the table 144 can have information about the customer 102 surfaced on their electronic device 108 based at least in part on the customer profile 130, as described herein. In some examples, a waitlist associated with a merchant location 116 may allow customers to self-enroll on the waitlist, such as by using an application executing on their electronic devices 106 to add themselves (and potentially other customers) to the waitlist without necessarily interacting with a host 200 at the merchant location 116. In this example, the device 106 may send a customer ID 202 to a computing system 204 to access a customer profile 130 of the customer 102 in response to the customer 102 self-enrolling on the waitlist associated with the merchant location 116. In some examples, proximity-based devices may be positioned at tables at a merchant location 116, such as near-field communication (NFC) devices, radio frequency identification (RFID) devices, Bluetooth® Low Energy (BLE) beacons, or the like. In these examples, when an electronic device 106 carried by a customer 102 moves within a threshold distance of a proximity-based device at a table 144, the proximity-based device may cause a push notification to be sent to the electronic device 106 of the customer 102 that allows the customer 102 to "check-in" at the merchant location 116. In some examples, the customer 102 may be able to check-in at a specific table 144 at the merchant location 116 in response to the push notification received from the proximity-based device at the table. This "check-in" of the customer 102 may cause the device 106 to send a customer ID 202 to a computing system 204 to access a customer profile 130 of the customer 102. In this example, when a server 104 approaches the table 144 where the customer 102 is checked-in and presumably seated, the server 104 can greet the customer 102 by their name, offer the customer 102 one of their favorite items, or the like, using the information presented via the user interface 300B, for example.

In a quick service restaurant, there may not be any tables for customers to sit down at the merchant location 116, and the customer experience may be akin to a walk-up experience where a customer 102 visits the merchant location 116, purchases an item(s) from the merchant location 116, and either enjoys the item(s) at or near the merchant location 116 or leaves with the purchased item(s) in their possession. In this scenario, the merchant location 116 may have a kiosk(s) at a counter, an entrance, and/or a drive through lane (e.g., where customers drive up to a kiosk and order items while they remain in their vehicle). In these examples, a customer 102 may scan an element (e.g., a QR code) at the kiosk(s) using their electronic device 106, which causes the device 106 to send a customer ID 202 to a computing system 204 to access a customer profile 130 of the customer 102. In this example, a digital assistant and/or a human server located at a counter, a pickup window, or the like, may provide a more personalized experience for the customer 102 by greeting the customer 102 by their name, by recommending a favorite item(s), or the like, as described herein. In some examples, a server 104 may represent someone at the merchant location 116 who carries an electronic device 108 with them so that, as customers 102 scan an element (e.g., a QR code) at a kiosk or a similar device 118 at the merchant location 116, the server 104 can greet customers 102 by saying something like "Welcome back, Jane," and potentially offer them a recommended item(s) that is surfaced on their device 108 based on the customer profile 130 of the customer 102 and item availability data 140. In some examples, information similar to the information shown in the user interface 300B of FIG. 3B can be surfaced on an electronic device 118 of a host 200 at a merchant location 116 (e.g., a host 200 in the front/lobby) so that the host 200 can similarly understand customers who are waiting to be seated at a table and possibly offer them item(s) that are in stock at the merchant location 116 while they wait for a table. Moreover, the recommendation(s) 308 for the customer 102 can be output via other devices. For example, the recommendation(s) 308 may be output via a device 118(N) (e.g., a tablet)—which may be fixed or movable—located at a table 144 where the customer 102 is seated, an electronic device 106 of the customer 102 (e.g., the customer's mobile phone), or the like. For instance, the customer 102 may use their own electronic device 106 to scan an element (e.g., QR code) at the merchant location 116, and, in response, the customer's device 106 may present information similar to the information shown in the user interface 300B of FIG. 3B, and/or information similar to the information shown in the user interface 150 of FIG. 1, and/or a menu of items available for purchase at the merchant location 116 along with a recommendation(s) 148, 308 for the customer 102.

In some examples, a customer 102 may make a reservation at a merchant location 116, and a computing system 204 may receive an ID 202 of the customer 102 in the process of making the reservation. For example, the customer 102 may utilize a website and/or an application executing on their electronic device 106 to make a reservation by specifying their name and/or phone number, a party size (e.g., how many guests will be visiting the merchant location 116), and a time and date for the reservation. In this example, the customer ID 202 (e.g., the customer's name, the customer's phone number, a device ID, an application ID, etc.) may be used by the computing system 204 to access a customer profile 130 of the customer 102 before, and within a threshold time period of, the start time of the reservation. In this way, when the customer 102 arrives at the merchant location 116 and is seated at their table 144, the server 104 has the most up-to-date information about the customer 102 and items in stock at the merchant location 116 to make a high-quality recommendation(s) to the customer 102. In some examples, a customer 102 may place an order for one or more item(s) available at the merchant location 116 ahead of arriving at the merchant location 116, and in the process of placing the order ahead of arrival, a computing system 204 may receive an ID 202 of the customer 102 (e.g., a payment instrument ID, the customer's name, the customer's phone number, etc.) that is used to access a customer profile 130 of the customer 102 before, and within a threshold time period of, the estimated pickup time for the order. In yet another example, a customer 102 may walk into a bar of a merchant location 116, order a drink (or another item(s)), and swipe, tap, or dip a payment instrument (e.g., credit card) at the bar to pay for the drink while the customer 102 waits for a table. In this example, the ID of the payment instrument may be received by the computing system 204 and may be used as a customer ID 202 to access a customer profile 130 of the customer 102, thereby allowing a server 104 to understand the customer 102 better when the customer 102 is eventually seated at a table 144 to which the server 104 is assigned.

Figure 4:
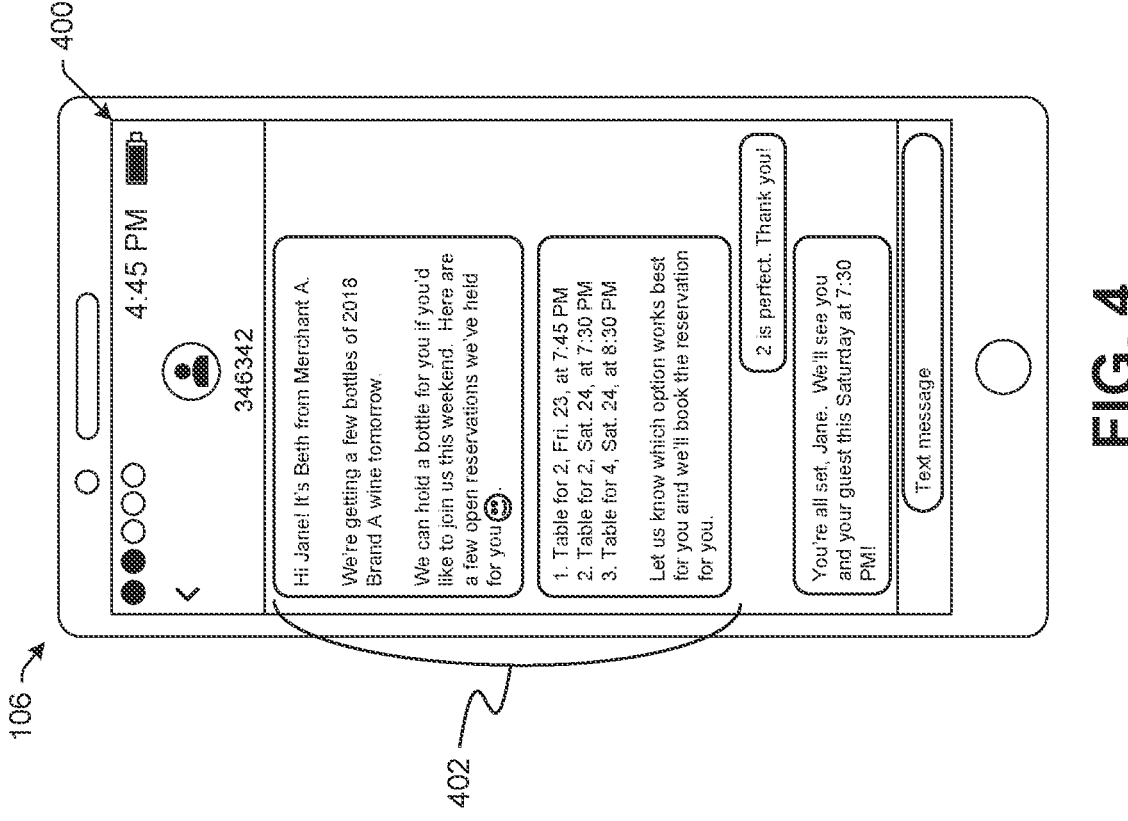
FIG. 4 is an example invitation sent to a customer based on a recent shipment of a preferred item of the customer to a merchant location, according to an implementation of the present subject matter.

FIG. 4 is an example invitation 402 sent to a customer 102 based on a recent shipment of a preferred item of the customer 102 to a merchant location 116, according to an implementation of the present subject matter. As mentioned above, the item availability data 140 may be accessed to generate a recommendation(s) associated with an item(s), which avoids, or at least mitigates, instances where a recommendation(s) is/are made for an item(s) that is/are out-of-stock at the merchant location 116. For instance, it may be the case that when a customer 102 visits a merchant location 116, a preferred item(s) of the customer 102 is/are temporarily out-of-stock. In this scenario, the recommendation component 138 is configured to determine that the item(s) is/are out of stock and avoid generating a recommendation(s) for the out-of-stock item(s) during the customer's visit to the merchant location 116. After the customer 102 leaves the merchant location 116, however, the merchant location 116 may receive, or may be about to receive, a shipment of item(s). In this scenario, the item availability data 140 may be updated to reflect that recent or upcoming shipment of the item(s), and in response to determining, from the updated item availability data 140, that the shipment of the item(s) has been, or will soon be, received at the merchant location 116, a computing system 204 may send an invitation 402 to the customer 102 based at least in part on the customer profile 130 of the customer 102 indicating that the item(s) shipped, or being shipped, is/are a preferred item(s) of the customer 102. The invitation 402 may indicate that the item(s) is/are in stock at the merchant location 116, and the invitation 402 may be received by the customer 102 via any suitable means, such as a text message, an electronic mail (email), a push notification surfaced via an application executing on an electronic device 106 of the customer 102, or the like. The example of FIG. 4 shows a user interface 400 that may be presented on an electronic device 106 of a customer 102 to present the invitation 402 to the customer 102. In this example, the invitation 402 is received in the form of a text message(s) to the customer's 102 phone number, which may be included in the customer profile 130 of the customer 102. The example invitation 402 of FIG. 4 indicates that bottles of the customer's 102 favorite wine will be in stock tomorrow, and invites the customer 102 to come back to the merchant location 116 during the upcoming weekend to enjoy some of their favorite wine. The example invitation 402 of FIG. 4 also includes an offer to hold the item(s) for the customer 102 if the customer 102 agrees to reserve a table at the merchant location 116 during the upcoming weekend. The invitation 402 also provides a few options for the customer 102 to reserve a table at the merchant location 116. In the example of FIG. 4, the customer 102 replies by accepting the invitation and specifying a desired time, date, and party size for the reservation (e.g., by selecting one of the options from the invitation 402), and the computing system 204 that receives the customer's 102 reply may store, in memory, reservation data 152 to make the reservation for the customer 102 according to the time, date, and party size of selected by the customer 102.

Figure 5:
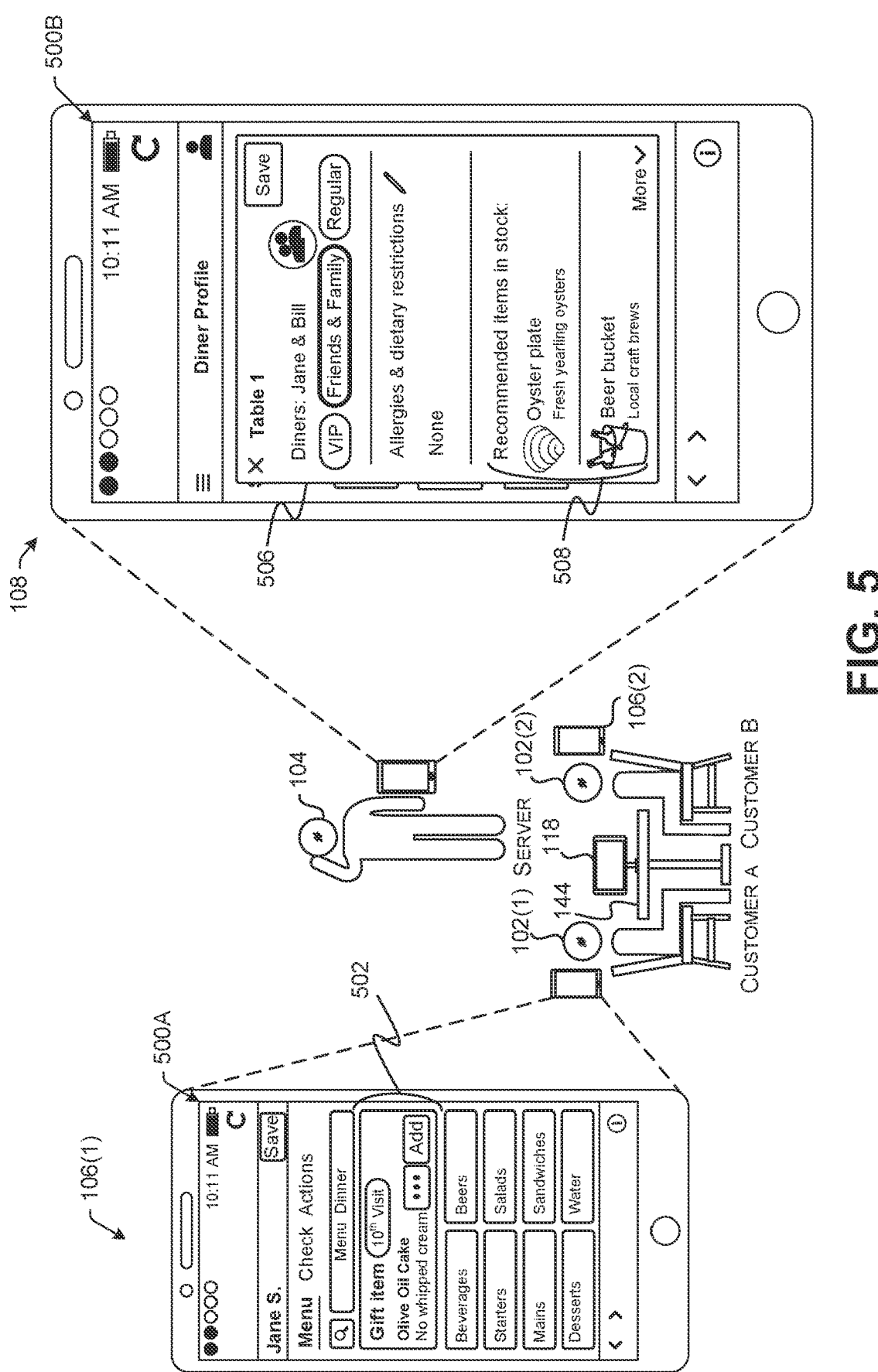
FIG. 5 illustrates example user interfaces presented on respective electronic devices of a server who is serving a group of customers and one of the customers in the group, according to an implementation of the present subject matter.

FIG. 5 illustrates example user interfaces 500 presented on respective electronic devices 106(1), 108 a customer 102(1) in a group and a server 104 who is serving the group of customers 102, according to an implementation of the present subject matter. With reference initially to the user interface 500A, a computing system (e.g., the server(s) 114, the server(s) 120, an electronic device(s) 118, the computing system 204, etc.) may cause the user interface 500A to be presented on an electronic device 106 of a customer 102(1) who is visiting a merchant location 116 at any suitable time. In some examples, the user interface 500A is presented by an application executing on the electronic device 106. In some examples, the user interface 500A is presented by a browser, such as a web browser. The example user interface 500A of FIG. 5 depicts a menu associated with the merchant location 116 that the customer 102(1) is visiting. The menu presented via the user interface 500A has been customized for the customer 102(1). In the example of FIG. 5, the menu presented via the user interface 500A provides a custom offer 502 to the customer 102(1). In some examples, the customer 102(1) may have used their electronic device 106(1) to scan an element (e.g., a QR code) at the merchant location 116 (e.g., an element at the table 144 where the customer 102(1) is seated), and in response to scanning the element, a computing system 204 may cause the user interface 500A to be presented on the electronic device 106(1) of the customer 102(1) with the custom offer 502. In this example, and as mentioned above, in response to scanning the element, the computing system 204 may receive an ID 202 of the customer 102(1), which can be used to access a customer profile 130 of the customer 102(1). Upon accessing the customer profile 130, the computing system 204 may determine that the customer's 102 visit represents the customer's 102(1) tenth visit to the merchant location 116, and, as a reward for their loyalty, the customer 102(1) is provided with a custom offer 502 (e.g., a gift item(s)), such as a free olive oil cake. In this manner, the menu associated with the merchant location 116 is customized for the specific customer 102(1). Furthermore, as discussed above, the computing system 204 may access item availability data 140 to confirm that the gift item(s) (e.g., the olive oil cake) is in stock at the merchant location 116 before causing the custom offer 502 to be presented via the user interface 500A. In some example, a fixed device 118 at the table 114 may present the user interface 500A, or a similar user interface. In this latter example, the customer 102(1) may provide user input to the fixed device 118 to log in to a customer account via the fixed device 118, and/or the fixed device 118 may detect that the electronic device 106(1) of the customer 102(1) is within a threshold distance of the fixed device 118 (e.g., based on NFC between the device 106(1) and the device 118), and/or the computing system 204 may receive (e.g., from an electronic device 118 of a host 200) an indication 212 that the customer 102(1) has been seated at the table 144, and, in response to any of these events, the fixed device 118 may display the user interface 500A.

Turning now to the user interface 500B, the electronic device 108 of the server 104 who is assigned to the table 144 may present information about a group of customers 102(1) and 102(2) seated at the table 144. As mentioned above, the customer profiles 130 may include group profiles associated with two or more customers. In the example of FIG. 5, a first customer 102(1) and a second customer 102(2) (and potentially one or more additional customers) may visit a merchant location 116 together (e.g., as a group, a party, etc.). In this scenario, one or more IDs 202 of one or more of the customers 102(1), 102(2) in the group may be received by a computing system 204 in any of the ways described herein. For example, each of the customers 102(1), 102(2) may use their respective devices 106(1), 106(2) to independently scan an element (e.g., a QR code) at the merchant location 116, which may cause respective customer IDs 202 to be received by a computing system 204. In another example, at least one of the customers 102(1), 102(2) in the group may submit a self-service order using at least one of the electronic devices 106(1), 106(2), whereby a check is to be split between the multiple customers 102(1), 102(2) in the group, and the computing system 204 receives respective customer IDs 202 (e.g., respective IDs of respective payment instruments used by the customers 102(1), 102(2) to split the check) as part of the self-service order. In another example, at least one of the customers 102(1), 102(2) may have made a reservation at the merchant location 116, and in the process of doing so, the customer 102(1) making the reservation may select an option to add another customer(s) to their party, which causes a link to be sent to the device 106(2) of the other customer 102(2), in the example of FIG. 5. Upon selecting the link, the customer 102(2) can provide their information (e.g., name, phone number, etc.) as an ID 202 of the customer 102(2). In yet another example, at least one of the customers 102(1), 102(2) may have been added to a waitlist for a table at the merchant location 116 that can accommodate the group of customers, which causes a customer ID(s) 202 to be received by the computing system 204, as described above with reference to FIG. 2 in a scenario for an individual customer 102.

Based on one or more past visits of the customers 102(1), 102(2) to the merchant location 116, for example, the computing system 204 may have built a group profile 130 for the group of customers 102(1), 102(2) at least in part due to their association with each other (e.g., sitting at the same table during their past visits to the merchant location 116). For instance, the customers 102(1), 102(2) may frequently visit the merchant location 116 together (e.g., for a weekly lunch), and a group profile 130 may have been built for these customers 102(1), 102(2) based on their past visits to the merchant location 116 together. Accordingly, upon receipt of multiple customer IDs 202 of the multiple customers 102(1), 102(2) seated at the same table 144, for instance, the computing system 204 may access a group profile 130 associated with the customers 102(1), 102(2), may generate a recommendation(s) 508, and may cause the electronic device 108 of the server 104 assigned to the table 144 to output the recommendation(s) 508, similar to the ways described above with respect to the individual customer 102. In the example of FIG. 5, the electronic device 108 of the server 104 is configured to output the user interface 500B, which includes a guest tab 506, the guest tab 506 including the recommendation(s) 508. The implementation of the user interface 500B may be similar to the user interface 300B described above, except that the information about the customers 102(1), 102(2) is presented together in a common guest tab 506 of the user interface 500B based on the group profile 130 associated with the customers 102(1), 102(2). In this way, the server 104 can understand the group of customers 102(1), 102(2) and may proactively offer a favorite item(s) of the group (e.g., an oyster plate, a bucket of beers, etc.). In some examples, a single customer ID 202 of one of the customers 102(1) in the group is received by the computing system 204, yet the computing system 204 may determine (e.g., from party size information submitted as part of a reservation request and/or when the customer 102(1) was added to a waitlist, etc.) that the customer 102(1) is dining with another customer(s). In this latter example, the recommendation(s) 508 generated and surfaced via the electronic device 108 of the server 104 may be catered to a group of customers rather than the individual customer 102(1) even though the identities of the additional customer(s) in the group may be unknown to the computing system 204. For example, instead of recommending a glass of the customer's 102(1) favorite wine, the recommendation 508 may include the recommendation for a bucket of beer, or perhaps a bottle of the customer's 102(1) favorite wine based on the determination that there are multiple customers seated at the table 144. The group recommendation(s) 508 may not be suitable for the individual customer(s) 102(1), but may be more appropriate for a group of multiple customers. Moreover, the recommendation(s) 508 for the customers 102 can be output via other devices. For example, the recommendation(s) 508 may be output via a device 118 (e.g., a tablet)—which may be fixed or movable—located at the table 144 where the customers 102(1), 102(2) are seated, the electronic devices 106(1), 106(2) of the customers 102(1), 102(2) (e.g., the customers' mobile phones), or the like. For instance, one or more of the customers 102(1), 102(2) may use their own electronic devices 106(1), 106(2) to scan an element (e.g., QR code) at the merchant location 116, and, in response, the customers' device 106(1), 106(2) may present information similar to the information shown in the user interface 500B of FIG. 5, and/or information similar to the information shown in the user interface 300B of FIG. 3B, and/or information similar to the information shown in the user interface 150 of FIG. 1, and/or information similar to the information shown in the user interface 500A of FIG. 5, such as a menu of items available for purchase at the merchant location 116 along with a recommendation(s) 508 for the customers 102(1), 102(2).

In some examples, the recommendation component 138 may use an AI model(s) 154 to dynamically generate recommendations for a customer 102 or a group of customers 102(1), 102(2), etc. In some examples, the AI models described herein can be, or include, machine learning models. Machine learning generally involves processing a set of examples (called "training data" or a "training dataset") in order to train a machine learning model(s). A machine learning model(s), once trained, is a learned mechanism that can receive new data as input and estimate or predict a result as output. For example, a trained machine learning model can comprise a classifier that is tasked with classifying unknown input (e.g., an unknown image) as one of multiple class labels (e.g., labeling the image as a cat or a dog). In some cases, a trained machine learning model is configured to implement a multi-label classification task (e.g., labeling images as "cat," "dog," "duck," "penguin," and so on). In the context of the present disclosure, the unknown input may be a customer profile 130 (or a group profile 130), and/or a signal(s) that is/are generated based on the customer profile 130 (or group profile 130), and the trained machine learning model(s) may be tasked with outputting a recommendation(s) associated with an item(s) for the customer 102 or the group of customers 102(1), 102(2), etc. In the group example, the trained AI model(s) 154 may be configured to identify correlations between (e.g., overlapping interests of) multiple customers 102(1), 102(2) in a group, which may not be readily identifiable by a human performing a cursory inspection of the respective customer profiles 130 of each customer 102(1), 102(2) in the group, especially for a group of a relatively large number of customers (e.g., a party of fifteen customers). Moreover, using a trained AI model(s) 154 to output a recommendation(s) 148, 308, 508 for a customer(s) may provide a benefit in an instance where the customer(s) 102 has/have never dined at the particular merchant location 116 in the past, and/or in a scenario where a customer 102(1) in a group of customers has dined at a particular merchant location 116 alone in the past, but not as part of a group. In these examples, the "never-before-seen" customer and/or group of customers may not have a "favorite" item for the computing system 204 to recommend, and the trained AI model(s) 154 may be used in such a scenario to identify one or more similar customers and/or similar cohorts of customers to the customer(s) 102 in question so that a high-quality recommendation(s) can be made for the customer(s) 102.

The AI model(s) 154 (e.g., trained machine learning model(s)) used by the recommendation component 138 may represent a single model or an ensemble of base-level AI models, and may be implemented as any type of AI model. For example, suitable AI models 154 for use by the techniques and systems described herein include, without limitation, neural networks (e.g., deep neural networks (DNNs), recurrent neural networks (RNNs), etc.), tree-based models (e.g., eXtreme Gradient Boosting (XGBoost) models), support vector machines (SVMs), kernel methods, random forests, splines (e.g., multivariate adaptive regression splines), hidden Markov model (HMMs), Kalman filters (or enhanced Kalman filters), Bayesian networks (or Bayesian belief networks), multilayer perceptrons (MLPs), expectation maximization, genetic algorithms, linear regression algorithms, nonlinear regression algorithms, logistic regression-based classification models, or an ensemble thereof. An "ensemble" can comprise a collection of AI models 154 whose outputs (predictions) are combined, such as by using weighted averaging or voting. The individual AI models of an ensemble can differ in their expertise, and the ensemble can operate as a committee of individual AI models that is collectively "smarter" than any individual AI model of the ensemble.

The training dataset that is used to train the AI model 154 (e.g., machine learning model(s)) may include various types of data, including previously collected customer data 128 and/or merchant data 126. In general, a training dataset for machine learning can include two components: features and labels. However, the training dataset used to train the AI model(s) 154 (e.g., machine learning model(s)) may be unlabeled, in some embodiments. Accordingly, the AI model(s) 154 (e.g., machine learning model(s)) may be trainable using any suitable learning technique, such as supervised learning, unsupervised learning, semi-supervised learning, reinforcement learning, and so on. The features included in the training dataset can be represented by a set of features, such as in the form of an n-dimensional feature vector of quantifiable information about an attribute of the training dataset. For example, features of the customer data 128 used in the training dataset may include merchant locations visited by customers, preferences of customer (e.g., items preferred, seating preferences, such as whether the customers prefer sitting outside, inside, at the bar, etc.), customer likes and/or dislikes about particular merchant locations and/or services provided at the merchant locations, transaction histories of customer (e.g., orders placed, items purchased, times at which orders were placed and/or items were purchased, transaction amounts, where the orders were placed and/or the items were purchased, mechanisms used to place orders and/or purchase items (e.g., online, on premise via a POS device, etc.), or the like), visitation histories of customers (e.g., times and/or durations of past visits by customers to merchant locations), allergies and/or dietary restrictions of customers, the customers' statuses with particular merchants and/or merchant locations (e.g., whether the customers are VIPs, friends and family members, regulars, rewards members, loyalty members, etc.), events (e.g., birthdays, anniversaries, etc.) associated with customers, payment methods (e.g., card on file, payment application, etc.) used by customers, or the like. Features of the merchant data 126 used in the training dataset may include merchant locations, hours of operation, transaction histories (e.g., orders placed and/or fulfilled), numbers of customers visiting merchant locations on a daily basis, statistics relating thereto, or the like. In the context of generative AI models, the generative AI models can train models (e.g., generative adversarial network (GAN) models) on visual data, text data, audio data, transaction data, or the like to generate recommendations. During training of the models, a discriminator may be used to evaluate the performance of the model in generating recommendations. Further in some cases, the generation of recommendations can be responsive to a text input, audio/visual input, haptic input into a generative AI model. As part of the training process, weights may be set for machine learning. These weights may apply to a set of features included in the training data, as derived from historical data (e.g., previously collected customer data 128 and/or merchant data 126) in the datastore 124. In some embodiments, the weights that are set during the training process may apply to parameters that are internal to the AI model(s) (e.g., weights for neurons in a hidden-layer of a neural network). These internal parameters of the AI model(s) 154 may or may not map one-to-one with individual input features of the set of features. The weights can indicate the influence that any given feature or parameter has on the output of the trained AI model(s) 154 (e.g., machine learning model(s)).

Other factors that may influence recommendations generated dynamically by the recommendation component 138, with or without the use of the AI model(s) 154, include social connection data of customers (e.g., looking up social connections that are trusted by the customer 102 to make a recommendation to the customer 102 based on one or more of the social connections), other customers who have ordered similarly to the customer 102 in the past (e.g., "customers like you have ordered item A in the past, so we recommend trying item A"), customer feedback received via digital receipts at a time of checkout, customer feedback received via surveys, or the like (e.g., negative feedback provided in a customer evaluation may influence a recommendation for the customer 102), the number of customers in a party, a time of day that the recommendation(s) is/are being made, the day of the week day that the recommendation(s) is/are being made, whether the customer is a first time customer or a repeat customer, where the customer is sitting in the restaurant, or the like. Further, it is to be appreciated that customer profiles 130 that are built and used for making recommendations to customers, as described herein, may be built based on past visits to a single merchant location, past visits to multiple merchant locations associated with a single merchant, and/or past visits to multiple different merchant locations associated with multiple different merchants. In other words, a customer profile 130 associated with a particular customer 102 may have been built based on past visits to merchant locations 116 associated with Merchant A and Merchant B, for example. If the customer subsequently visits a merchant location 116 associated with Merchant C for the first time (e.g., the customer has never visited any of Merchant C's merchant locations), the customer profile 130 built based on the customer's previous visits to other merchants (e.g., Marchant A and Merchant B) may be used to dynamically generate a recommendation(s) and surface the recommendation(s) on an electronic device 108 of a server 104 who is working at the merchant location 116 associated with Merchant C that the customer is visiting. In this way, recommendations can be generated for "new" customers the first time they visit a particular merchant location 116.

Figure 6:
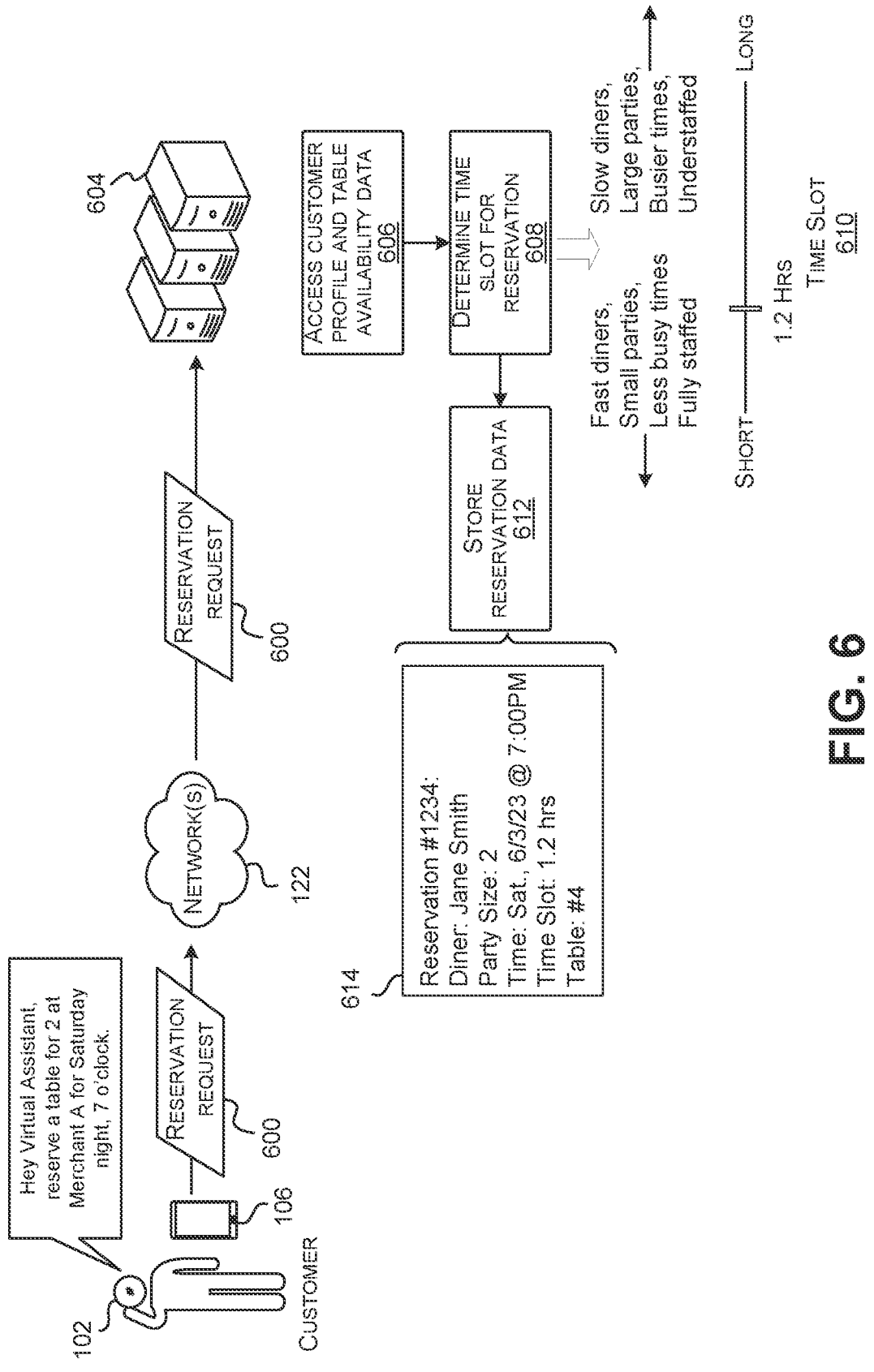
FIG. 6 is an example diagram illustrating a technique for dynamically determining a time slot for a reservation based at least in part on a customer profile of a customer who is a party to the reservation, according to an implementation of the present subject matter.

FIG. 6 is an example diagram illustrating a technique for dynamically determining a time slot for a reservation based at least in part on a customer profile 130 of a customer 102 who is a party to the reservation, according to an implementation of the present subject matter. In the example of FIG. 6, a customer 102 submits a request 600 to make a reservation at the merchant location 116 (e.g., a restaurant) using an electronic device 106. For example, the customer 102 may use a browser executing on the electronic device 106 to access a website of a merchant, a third-party reservation website, or the like, in order to submit the reservation request 600. In some examples, the customer 102 may use an application executing on the electronic device 106 to submit the reservation request 600. In the example of FIG. 6, the customer 102 utters a voice command to a digital assistant executing on the device 106 by saying something like "Hey Virtual Assistant, reserve a table for 2 at Merchant A for Saturday night, 7 o'clock." In response to this voice command, the digital assistant may cause the electronic device 106 of the customer 102 to send the reservation request 600 to a computing system 604. The computing system 604 shown in FIG. 6 may represent the server(s) 114, the server(s) 120, an electronic device 118 at the merchant location 116 (See FIG. 1), and/or the computing system 204 (See FIG. 2). Furthermore, the reservation request 600 may include a customer ID 202, such as the customer's 102 name, the customer's 102 phone number, an ID of the device 106, an ID of an application executing on the device 106, or the like. For example, the digital assistant executing on the device 106 may be configured to retrieve a customer ID 202 that is stored on the device 106, such as the customer's 102 phone number, and may submit the retrieved customer ID 202 with the reservation request 600. In another example, the customer 102 may provide a customer ID 202 via user input in the process of submitting the reservation request 600 using the device 106.

Based at least in part on the customer ID 202 included in the reservation request 600, the computing system 604 may, at block 606, access a customer profile 130 of the customer 102. For example, the customer profiles 130 may be indexed in the data store(s) 124 by customer ID 202 (e.g., the customer's 102 name, phone number, etc.). In some examples, the customer profile component 134 (See FIG. 1) may access the customer profile 130 at block 606 based on the customer ID 202 received with the reservation request 600. The customer profile component 134 may also provide the customer profile 130 to a reservation component 156 of the payment service 110 (See FIG. 1) for purposes of making the reservation for the customer 102 with a time slot that is dynamically determined at block 608. At block 606 of FIG. 6, the computing system 604 may also access table availability data 158 (See FIG. 1) indicating at least past availability of tables at the merchant location 116, and potentially also current availability of tables at the merchant location 116. This table availability data 158 may be maintained in a data store(s) 142 accessible to the server(s) 120 (See FIG. 1), for example. In some examples, the reservation component 156 may access the table availability data 158 from the data store(s) 142 via the API(s) 132 (See FIG. 1) and may utilize the table availability data 156 to determine the time slot for the reservation at block 608. Accordingly, as shown at block 608 of FIG. 6, the computing system 604 (e.g., the reservation component 156) may determine a time slot 610 indicating a start time of the reservation and an end time of the reservation based at least in part on the customer profile 130 and the table availability data 158. The example time slot 610 determined at block 608 of FIG. 6 is a 1.2 hour time slot with a start time of 7:00 PM and an end time of 8:12 PM on Saturday, Jun. 3, 2023.

The table availability data 158 may indicate, for example, that a party of two dined at Table 1 at a merchant location 116 on a Wednesday afternoon for 1.5 hours, followed by a party of four that dined at Table 1 on Wednesday evening for 2.3 hours, and so on and so forth. Similar table availability data 158 may indicate past availability of other tables at the merchant location 116 as well, including data that indicates times and days when tables were unused and for how long they were unused (e.g., empty, available, etc.). Accordingly, at block 608, the computing system 604 (e.g., the reservation component 156) may analyze this table availability data 158 to obtain a "bigger picture" of the availability of tables at the merchant location 116 over a period of time in the past, which may aid in a prediction of how those tables will (or will not) be used in the future. Furthermore, by analyzing the customer profile(s) 130 of the customer(s) 102 who is/are a party to the reservation, and, in some examples, by processing the data in the reservation request 600 itself, the computing system 604 (e.g., the reservation component 156) can determine characteristics of the customer(s) 102, such as whether the customer(s) 102 is/are a fast diner(s) or a slow diner(s) based at least in part on a visitation history of the customer(s) 102 (e.g., times and/or durations of past visits by the customer(s) 102 to the merchant location 116), how much money the customer(s) 102 typically spend(s) on a given day/night, or how their spend at the merchant location 116 varies day-to-day at the merchant location 116, the customer's 102 status in terms of whether they are a VIP, a friends and family member, a regular, a rewards member, a loyalty member, etc., allergies and/or dietary restrictions of the customer 102, events (e.g., birthdays, anniversaries, etc.) associated with the customer 102, or the like. One or more of these customer characteristics—determined at least in part from the customer profile(s) 130—may influence the prediction of the duration of the customer's 102 upcoming visit to the merchant location 116, which is scheduled to start at the start time of the requested reservation. Other factors that may influence the prediction of the duration of the customer's 102 upcoming visit to the merchant location 116 may include the day and/or the time of day of the reservation (e.g., whether the reservation is on Valentine's Day at dinner time, on Mother's Day at brunch time, or on a random Wednesday with a mid-afternoon start time), the party size (e.g., relatively large parties of, say, six or more customers tend to take longer to dine at a restaurant than relatively small parties of, say, fewer than six customers), the table that the customer(s) 102 is/are likely to be seated at, the type of restaurant (e.g., a fancy/high-end, full service restaurant that provides several courses of dinner and dessert will generally take longer to dine at than a quick service restaurant), staffing resources available during the reservation, which may be determined from the staffing data 146 closer-in-time to the start time of the reservation (e.g., if several workers call in sick and/or kitchen capacity is limited on the day of the reservation and the merchant location 116 is understaffed as a result, the customer's 102 visit may take longer than usual). Accordingly, some or all of these factors may be considered in predicting a duration of the customer's 102 upcoming visit to the merchant location 116 in order to dynamically determine a suitable time slot 610 for the reservation that is not too short and not too long to optimize the utilization of resources (e.g., tables) at the merchant location 116, and the time slot 610 can be iteratively adjusted, as needed, as the start time of the reservation draws near, as will be described in more detail below. As shown in FIG. 6, the time slot 610 can be dynamically determined as a relatively shorter time slot if the customer 102 is determined to be a fast diner, and/or the party size is relatively small (e.g., fewer than six customers), and/or the time of the reservation is during a time that is typically not very busy for the merchant location 116, and/or the merchant location 116 will be fully staffed at the time of the reservation. By contrast, the time slot 610 can be dynamically determined as a relatively longer time slot if the customer 102 is determined to be a slow diner, and/or the party size is relatively large (e.g., six or more customers), and/or the time of the reservation is during a time that is typically busy for the merchant location 116 (e.g., Valentine's Day dinner, Mother's Day brunch, etc.), and/or the merchant location 116 will be understaffed at the time of the reservation.

In some examples, the reservation component 156 may use an AI model(s) 154 to dynamically determine time slots 610 for customers 102 who are making reservations at merchant locations, such as the merchant location 116. As mentioned above, the AI models described herein can be, or include, machine learning models. In the context of the present disclosure, the unknown input to the AI model(s) 154 may be a customer profile 130 (or a group profile 130) and table availability data 158, and/or a signal(s) that is/are generated based on such data, and the trained machine learning model(s) may be tasked with outputting a prediction of a duration of the visit of the customer(s) 102 to the merchant location 116, which can be used by the reservation component 156 to determine the time slot 610. In some examples, if the trained AI model(s) 154 predicts that the customer 102 will visit (e.g., dine at) the merchant location 116 for 1.2 hours, the reservation component 156 may set the time slot 610 for the reservation at a period of 1.2 hours starting at the requested start time of the reservation.

With the time slot 610 determined at block 608, the reservation component 156 may, at block 612 store, in memory (e.g., the data store(s) 124 and/or 142), reservation data 152 to make the reservation for the customer(s) 102, the reservation data 152 indicating details 614 of the reservation made for the customer(s) 102. The exemplary reservation details 614 shown in FIG. 6 indicate a reservation ID (e.g., Reservation #1234), the name of the customer 102 (e.g., Diner: Jane Smith), the party size (e.g., Party Size: 2), the start time of the reservation (e.g., Time: Sat, 6/3/23 @7:00 PM), the time slot 610 for the reservation (e.g., Time Slot: 1.2 hrs), and/or a table ID (e.g., Table: #4). It is to be appreciated that additional or fewer data may be included in the reservation details 614, and that some or all of the reservation details 614 may be provided to the customer 102 (e.g., sent to the customer 102 via email, text message, etc.) as a confirmation of the reservation and/or to inform the customer 102 as to the details 614 of the reservation to increase the likelihood that the customer 102 will show up at the merchant location 116 at the reserved time.

In some examples, the reservation may be made by the customer 102 relatively far (e.g., weeks, months, etc.) in advance of the start time of the reservation, which may be the case for a particularly popular, high-end restaurant. Accordingly, and as mentioned above, the reservation component 156, in some examples, may be configured to adjust (e.g., iteratively) the time slot 610 closer in time to the start time based on updated data (e.g., updated staffing data 146). Consider an example where the customer 102 in FIG. 6 makes a reservation weeks ahead of time. In this example, at a time before, and within a threshold time period of, the start time of the reservation, (e.g., days before the start time, a day before the start time, hours before the start time, etc.), the computing system 604 (e.g., the reservation component 156) may access the staffing data 146 (which is being continually updated) indicating a number of workers who are, or will be, working at the merchant location 116 during the time slot 610 of the reservation. If, for example, the staffing data 146 indicates that the merchant location 116 is, or will be, fully staffed during the time slot 610 of the reservation, the computing system 604 (e.g., the reservation component 156) may refrain from adjusting the time slot 610. However, if the staffing data 146 indicates that the merchant location 116 is, or will be, understaffed (e.g., if several workers called in sick and/or kitchen capacity is limited on the day of the reservation for the customer 102), the computing system 604 (e.g., the reservation component 156) may modify the end time of the reservation for the customer 102 to adjust the time slot 610 to obtain an adjusted time slot 610, and the computing system 604 (e.g., the reservation component 156) may store, in memory (e.g., the data store(s) 124 and/or 142), updated reservation data 152 to modify the reservation for the customer 102, wherein the updated reservation data 152 indicates at least the adjusted time slot 610. In some examples, the customer 102 is not notified of this adjustment because the start time of the reservation is unchanged notwithstanding the adjustment of the time slot 610. Furthermore, providing a buffer between sequential reservations at a given table at the merchant location 116 may facilitate this time slot 610 adjustment. For example, if a buffer of 15 minutes is kept/maintained between sequential reservations for a given table, the computing system 604 (e.g., the reservation component 156) may have room to extend the end time of a given time slot 610 up to, say, 15 minutes later than the originally-scheduled end time of the time slot 610. This buffer is configurable to allow for greater flexibility at the cost of less-efficient utilization of resources (e.g., tables).

In some examples, the computing system 604 (e.g., the reservation component 156) is configured to determine a recommended table for the customer 102 who is making the reservation, and to reserve the recommended table for the customer 102 when making the reservation. For example, if the customer profile 130 of the customer 102 indicates that their favorite table at the merchant location 116 is Table #4, the reservation data 152 may indicate that the reservation is for Table #4 (assuming that table is available at the requested time). In another example, based at least in part on the customer's 102 status (e.g., VIP, regular, etc.), the computing system 604 (e.g., the reservation component 156) may recommend a table of a particular type (e.g., a VIP table). The reservation may default to the recommended table, yet the customer 102 may be permitted to change the table, assuming another table is available at the time of the reservation.

The dynamic determination of a time slot 610 for a reservation allows for more efficient utilization of resources, such as tables, at the merchant location 116. In other words, with dynamically-determined time slots for reservations, the time slots are better catered to the customers making those reservations, and a table can be made ready for the next customer shortly after a diner finishes at the table, for example, so that the table does not remain empty or unused for a significant period of time. Moreover, overlapping reservations can be mitigated by ascribing relatively long time slots to relatively slow diners, and/or to reservations made for large diner groups at relatively busy times and/or when the merchant location 116 is understaffed. Additionally, the customer experience is improved because customers are more likely to be able to reserve a table at a merchant location 116 due to the improved utilization of resources (e.g., tables), as compared to the conventional slot booking model noted above.

Figure 7:
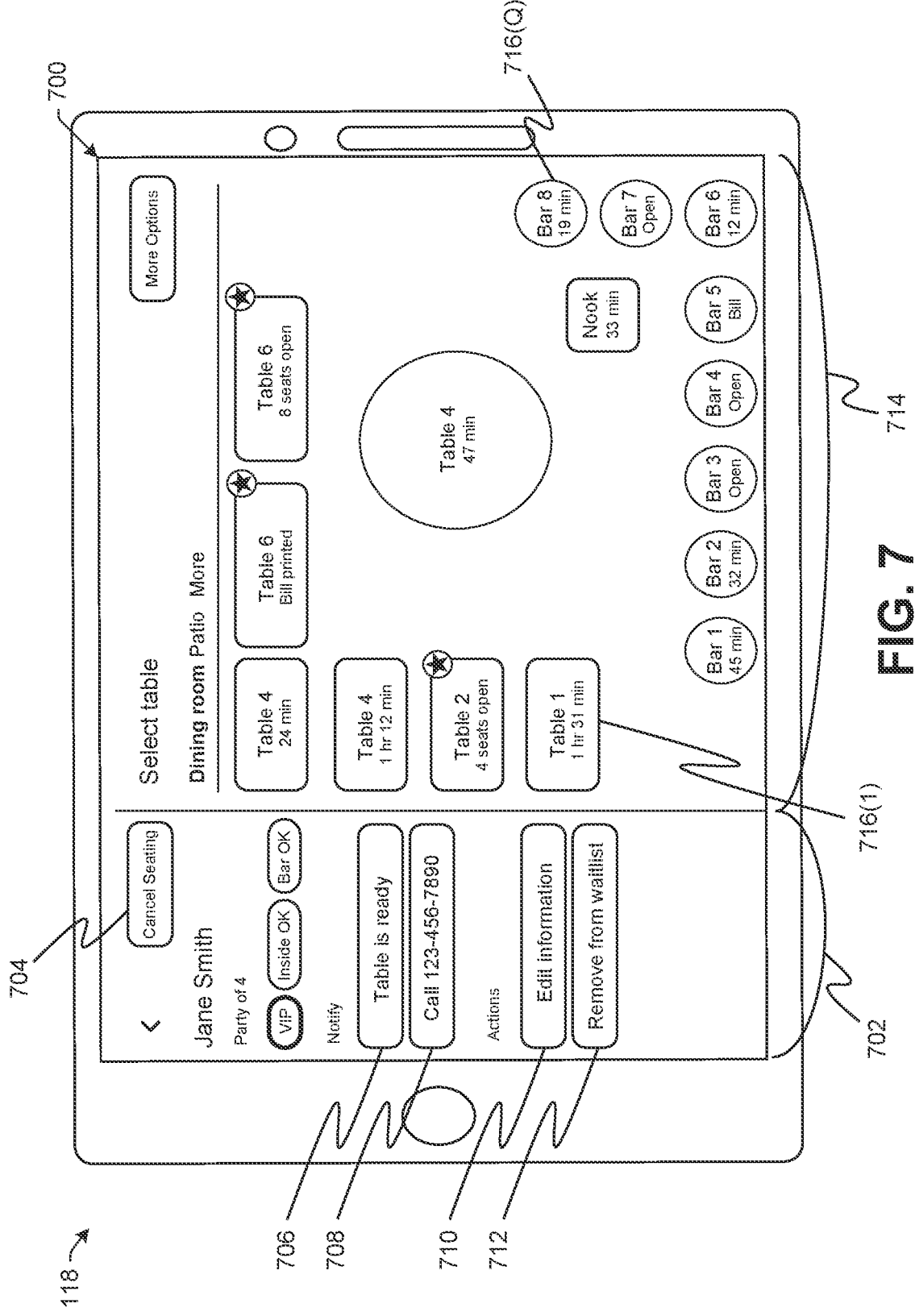
FIG. 7 is an example user interface presenting real-time table availability data for a merchant location in conjunction with information about a customer who has been added to a waitlist associated with the merchant location, according to an implementation of the present subject matter.

FIG. 7 is an example user interface 700 presenting real-time table availability data 158 for a merchant location 116 in conjunction with information about a customer 102 who has been added to a waitlist associated with the merchant location 116, according to an implementation of the present subject matter. A computing system (e.g., the server(s) 114, the server(s) 120, an electronic device(s) 118, the computing system 204, and/or the computing system 604, etc.) may cause the user interface 700 to be presented on an electronic device 118 at a merchant location 116 at any suitable time. In some examples, the user interface 700 is presented by an application executing on the electronic device 118. In some examples, the user interface 700 is presented by a browser, such as a web browser. In some examples, a host 200 at the merchant location 116 may utilize the electronic device 118 to seat customers at tables at the merchant location 116. The example user interface 700 of FIG. 7 includes a first panel 702 presenting information about a customer 102 who has been added to a waitlist associated with the merchant location 116. A user (e.g., the host 200) may navigate to this customer information by selecting a name of the customer 102 on a waitlist. In the example of FIG. 7, the first panel 702 of the user interface 700 includes the customer's 102 name, the party size (e.g., party of 4), the customer's status (e.g., VIP), and information indicating that the customer 102 is OK being seated inside and at the bar of the merchant location 116. The first panel 702 of the user interface 700 may further include one or more interactive elements, such as a first interactive element 704 to cancel the seating of the customer 102, an interactive element 706 to notify the customer 102 (e.g., via a text message, a phone call, etc.) that their table is ready, an interactive element 708 to call the customer's 102 phone number, an interactive element 710 to edit information about the customer 102 (e.g., to add a customer preference to their customer profile 130), and/or an interactive element 712 to remove the customer 102 from the waitlist associated with the merchant location 116.

The example user interface 700 of FIG. 7 further includes a second panel 714 presenting real-time table availability data 158 for the merchant location 116. For example, the second panel 714 of the user interface 700 may include user interface elements 716(1) to 716(Q) associated with tables at the merchant location 116. The user interface elements 716 may or may not be interactive. In some examples, the user interface elements 716 are interactive, such as to assign a waitlisted customer 102 to a table (e.g., by interacting with a particular element 716 while the first panel 702 is presenting information about a specific customer 102 on the waitlist). The user interface elements 716 may include visual indicators (e.g., text, color-coded icons/symbols, etc.) to indicate a current availability status of each table. In the example of FIG. 7, the element 716(1) includes the text "1 hr 31 min" to indicate that Table 1 will be unavailable for one hour and 31 minutes from the current time. Accordingly, the visual indicators (e.g., text, color-coded icons/symbols, etc.) may update periodically (e.g., every minute) to indicate the current status of an individual table at the merchant location 116. As an example, after a minute transpires, the element 716(1) may be updated to include the text "1 hr 30 minutes," similar to a countdown timer. These time periods of unavailability may be based on the aforementioned dynamically-determined time slots, such as the time slot 610 discussed above with reference to FIG. 6. For example, if the customer 102 reserved Table 1, and if the dynamically-determined time slot 610 for the customer's 102 reservation was set at 1.6 hours, and if the customer 102 has been seated at Table 1 for four minutes, the visual indicator (e.g., text, color-coded icon/symbol, etc.) associated with the user interface element 716(1) may indicate that Table 1 is unavailable for another hour and 31 minutes because 1.6 hours minus four minutes equals one hour and 31 minutes. FIG. 7 shows other examples of visual indicators as well, such as "bill printed," "4 seats open," "open," and "bill." A visual indicator of "open" or "N seats open" (N being any suitable integer) may indicate that a table is currently available. A visual indicator of "bill" or "bill printed" may indicate that a table is about to become available. Furthermore, particular user interface elements 716 may be labeled with a "table type" icon (e.g., an encircled star) to indicate the type of table, such as a VIP table. Customers that are of a particular status (e.g., VIP) may be eligible to be seated at particular tables (e.g., VIP tables) to the exclusion of other customers that do not have a particular status or level of status.

Accordingly, the user interface 700 is a tool that may be used by a worker (e.g., a host 200) at a particular merchant location 116 to seat waitlisted customers at tables at the merchant location 116. In particular, the real-time table availability data 158 that is presented via the user interface 700 in association with user interface elements 716 (which are associated with tables at the merchant location 116) can help optimize utilization of resources (e.g., tables) at the merchant location 116 and/or provide a more robust and dynamic booking system. For example, the host 200, knowing that Table 2 is open with four available seats, may notify the VIP customer 102 shown in the first panel 702 that their table is ready by selecting the element 716 associated with Table 2 in the second panel 714 of the user interface 700, and/or by selecting the element 706 in the first panel 702 of the user interface 700. Meanwhile, the host 200 can continue monitoring the tables associated with the elements 716 that include a "bill printed" visual indicator in order to book (e.g., seat waitlisted customers at) those tables as soon as they become available.

The user interfaces 150, 300A, 300B, 400, 500A, 500B, and 700 are provided as examples of user interfaces that can be presented to facilitate techniques described herein. User interfaces can present additional or alternative data in additional or alternative configurations. That is, user interfaces 150, 300A, 300B, 400, 500A, 500B, and 700 should not be construed as limiting.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 8 is an example process 800 for implementing dynamic recommendations based on customer profiles, according to an implementation of the present subject matter. The process 800 can be implemented by a system (e.g., a computing system(s)) including one or more processors and memory storing computer-executable instructions to cause the one or more processors to perform the process 800. In some examples, the process 800 can be implemented by a server(s) 114 (and/or by a processor(s) of the server(s) 114), by a server(s) 120 (and/or by a processor(s) of the server(s) 120), by an electronic device(s) 118 at a merchant location 116, by a computing system 204, by a computing system 604, or a combination thereof. For discussion purposes, the process 800 is described with reference to the previous figures.

At 802, an ID 202 of a customer is received in association with a visit of the customer 102 to a merchant location 116 of a merchant. In some examples, the customer ID 202 is received at block 802 in association with adding the customer 102 to a waitlist associated with the merchant location 116. In some examples, the customer ID 202 is received at block 802 in association with a request 600 to make a reservation at the merchant location 116. In some examples, the customer ID 202 is received at block 802 from an electronic device 118 of a host 200 who seats customers at tables at the merchant location 116. In some examples, multiple IDs of multiple, different customers 102 are received at block 802. For example, at block 802, a first ID of a first customer, a second ID of a second customer, and potentially additional IDs of additional customers may be received in association with a visit of the customers to the merchant location 116. The customer ID(s) 202 can be received at block 802 in any of the ways described herein (e.g., in response to scanning an element, such as a QR code, with an electronic device 106 of the customer).

At 804, a customer profile 130 of the customer 102 is accessed based at least in part on the customer ID 202 received at block 802. In some examples, the customer profile 130 is accessed from a data store(s) 124 at block 804. In some examples, the customer profile 130 may have been generated based on customer data 128 collected in association with one or more past interactions of the customer 102 with the merchant. For example, the customer profile 130 may have been generated (e.g., built) based on customer data 128 collected in association with one or more past visits of the customer 102 to the merchant location 116, and/or one or more past visits of the customer 102 to one or more other merchant locations of the merchant. As another example, the customer profile 130 may have been generated based on customer data 128 collected in association with online interactions of the customer 102 with the merchant (e.g., online orders placed by the customer 102, reservations made by the customer 102, interactions of the customer 102 with a social media account of the merchant, a customer review(s) of the merchant posted by the customer 102, etc.). In some examples, the customer profile 130 may have been generated based on customer data 128 collected in association with one or more past interactions of the customer 102 with other merchants different from the merchant associated with the merchant location 116 that the customer is visiting, or is about to visit. In some examples, the accessing of the customer profile 130 at block 804 includes accessing a group profile 130 associated with multiple customers (e.g., a first customer, a second customer, etc.) based at least in part on respective IDs of the multiple customers.

At 806, item availability data 140 is accessed, the item availability data 140 indicating whether items are in stock at the merchant location 116. In some examples, the item availability data 140 is accessed from a data store(s) 142 at block 806. In some examples, the item availability data 140 includes a list of items that are typically available for purchase at the merchant location 116, labeled with an indicator (e.g., in stock, out of stock, etc.) to indicate whether those items are currently available at the merchant location 116 or not. In some examples, if an out-of-stock item has been shipped to the merchant location 116, but the item has not yet been received at the merchant location 116, the item availability data 140 may indicate an estimated delivery date of the item to the merchant location 116. In some examples, the merchant location 116 is a restaurant, and the items included in the item availability data 140 include food items (e.g., prepared meals, beverages, etc.).

At 808, a recommendation(s) associated with an item(s) that is/are in stock at the merchant location 116 is/are generated based at least in part on the customer profile 130 and the item availability data 140. In some examples, the recommendation(s) is/are generated at block 808 by analyzing the customer profile 130 and the item availability data 140 (e.g., using a trained AI model(s) 154). In some examples, the recommendation(s) generated at block 808 may be associated with an item(s) that is/are preferred by the customer 102 (e.g., as determined based on the customer profile 130). In some examples, the recommendation(s) generated at block 808 is/are based at least in part on a group profile 130 associated with multiple customers.

At 810, a determination is made as to whether the customer 102 is at the merchant location 116. For example, a computing system may monitor for the receipt of an indication 212 that the customer 102 is at the merchant location 116. If no indication is received at block 810, the process 800 may follow the NO route from block 810 to continue monitoring for an indication. If an indication 212 is received at block 810 that the customer 102 is at the merchant location 116, the process 800 may follow the YES route from block 810 to block 812. In some examples, the indication 212, if received at block 810, represents an indication that the customer 102 has been seated at a table at the merchant location 116. In some examples, the indication 212, if received at block 810, is received from an electronic device 118 of a host 200 at the merchant location 116.

At 812, in response to the receiving of the indication 212 at block 810, a server 104 may be determined. In some examples, the server 104 determined at block 812 is a server 104 assigned to the table 144 where the customer 102 has been seated. In some examples, the determining at block 812 includes accessing staffing data 146 from a data store(s) 142 indicating which servers 104 are assigned to which tables at the merchant location 116, and identifying the server 104 assigned to the table 144 where the customer 102 has been seated. In some examples, the merchant location 116 does not have tables, and the determination of the server 104 at block 812 includes determining any suitable server 104 at the merchant location 116 who is able to serve the customer 102 at the merchant location (e.g., a server 104 who is currently working at a front counter at the merchant location 116, such as a quick service restaurant).

At 814, in response to the receiving of the indication 212 at block 810, the recommendation(s) generated at block 808 is caused to be output via an electronic device 108 of the server 104 determined at block 812. Examples of recommendations being output via an electronic device 108 of a server 104 are shown in FIG. 1 (e.g., the recommendation(s) 148), FIG. 3B (e.g., the recommendation(s) 308), and FIG. 5 (e.g., the recommendation(s) 508).

At 816, in some examples, in response to the receiving of the indication 212 at block 810, a user interface is caused to be presented on the electronic device 108 of the server 104 determined at block 812. In some examples, the user interface presents an interactive element associated with the table where the customer 102 is seated. An example of such a user interface is the user interface 300A depicted in FIG. 3A, which presents the interactive element 302(1) associated with the table (e.g., Table 1) where the customer 102 is seated. In some examples, the server 104 receives a notification (e.g., a push notification) that the customer 102 is at the merchant location 116 and/or that the customer 102 has been seated at a table to which the server 104 is assigned. For example, the server 104 may receive a text message via their electronic device 108 indicating that the customer 102 has just been seated at their table. As another example, the interactive element 302(1) presented via the user interface 300A at block 816 may include a visual indicator 304 (e.g., the text "seated") to indicate that the customer 102 is seated at the server's 104 table, as shown in FIG. 3A.

At 818, in some examples, an indication of an interaction with (e.g., a selection of) the interactive element 302(1) is received via the user interface 300A presented at block 816. For example, the server 104 may interact with (e.g., via touch input provided via a touch screen of the electronic device 108, a voice command, etc.) the interactive element 302(1) associated with the table where the customer 102 is seated, which causes a computing system to receive the indication of the interaction at block 818.

At 820, the user interface may be caused to present information about the customer 102 seated at the table in response to the receiving of the indication of the interaction at block 818. The information presented via the user interface (e.g., the user interface 300B of FIG. 3B) may be based at least in part on the customer profile 130 of the customer 102 and may include the recommendation(s) generated at block 808.

Although the recommendation(s) generated at block 808 of the process 800 is/are described as being output via an electronic device 108 of the server 104, it is to be appreciated that the recommendation(s) generated for the customer 102 at block 808 can be output via other devices. For example, the recommendation(s) generated at block 808 may be output via one or more electronic devices at the merchant location 116 in lieu of, or in addition to, the server's electronic device 108, such as a device 118(N) (e.g., a tablet)—which may be fixed or movable—located at a table 144 where the customer 102 is seated, an electronic device 106 of the customer 102 (e.g., the customer's mobile phone), or the like. For instance, the customer 102 may use their own electronic device 106 to scan an element (e.g., QR code) at the merchant location 116, and, in response, the customer's device 106 may output the recommendation(s) generated at block 808 (e.g., along with a menu of items available for purchase at the merchant location 116).

Figure 9:
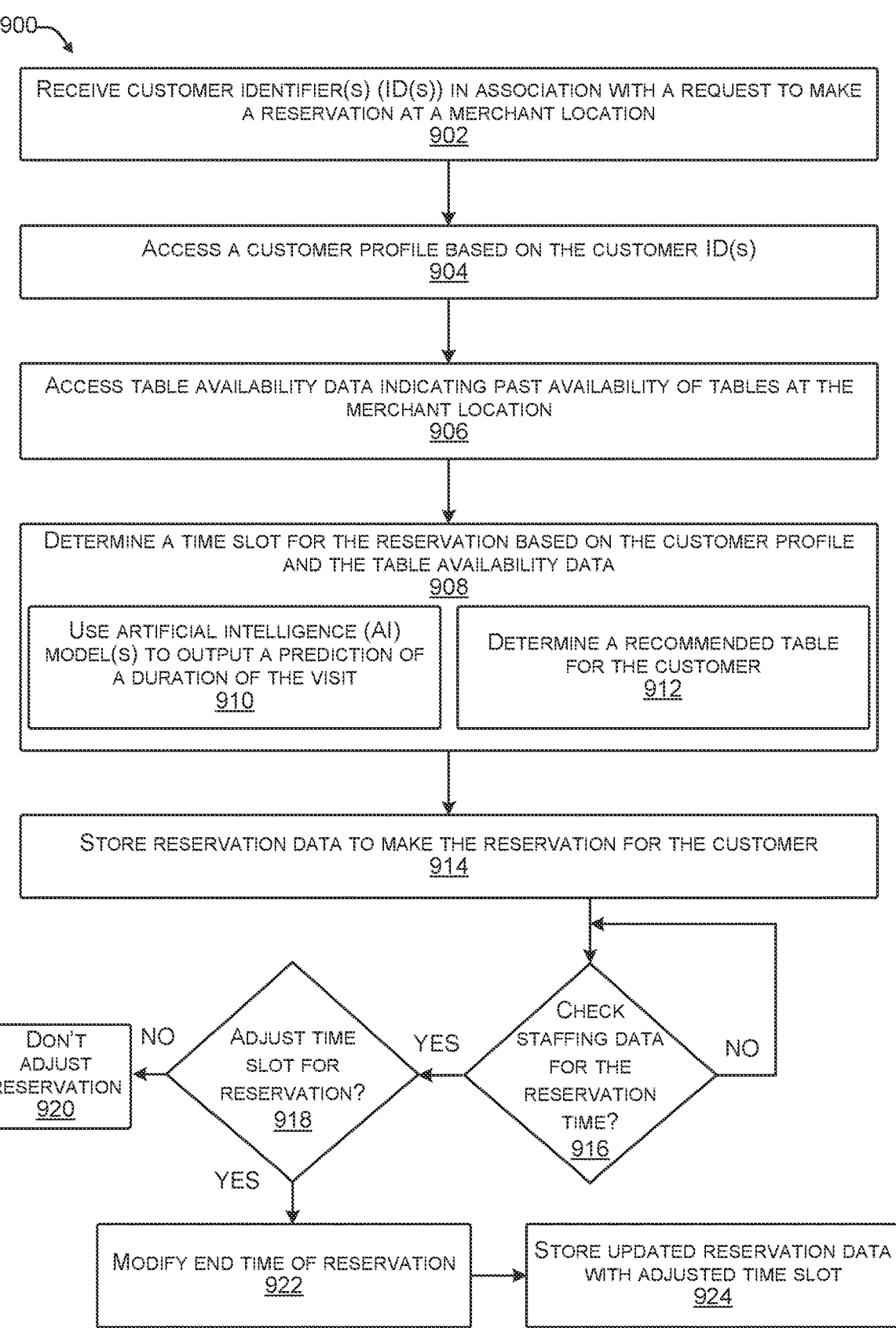
FIG. 9 is an example process for dynamically determining a time slot for a reservation made by a customer at a merchant location, according to an implementation of the present subject matter.

FIG. 9 is an example process 900 for dynamically determining a time slot for a reservation made by a customer at a merchant location, according to an implementation of the present subject matter. The process 900 can be implemented by a system (e.g., a computing system(s)) including one or more processors and memory storing computer-executable instructions to cause the one or more processors to perform the process 900. In some examples, the process 900 can be implemented by a server(s) 114 (and/or by a processor(s) of the server(s) 114), by a server(s) 120 (and/or by a processor(s) of the server(s) 120), by an electronic device(s) 118 at a merchant location 116, by a computing system 204, by a computing system 604, or a combination thereof. For discussion purposes, the process 900 is described with reference to the previous figures.

At 902, an ID 202 of a customer 102 is received in association with a request 600 to make a reservation at the merchant location 116. In some examples, the customer ID 202 and/or the reservation request 600 is received at block 902 from an electronic device 106 of the customer 102 (e.g., over a network 122). In some examples, multiple IDs of multiple, different customers 102 are received at block 902. For example, at block 902, a first ID of a first customer, a second ID of a second customer, and potentially additional IDs of additional customers may be received in association with a reservation request 600. In some examples, the reservation request 600 includes additional parameters of the reservation, such as a party size indicating a number of customers associated with the reservation, including the customer 102 making the reservation.

At 904, a customer profile 130 of the customer 102 is accessed based at least in part on the customer ID 202 received at block 902 in association with the reservation request 600. In some examples, the customer profile 130 is accessed from a data store(s) 124 at block 904. In some examples, the customer profile 130 may have been generated based on customer data 128 collected in association with one or more past interactions of the customer 102 with the merchant. For example, the customer profile 130 may have been generated (e.g., built) based on customer data 128 collected in association with one or more past visits of the customer 102 to the merchant location 116, and/or one or more past visits of the customer 102 to one or more other merchant locations of the merchant. As another example, the customer profile 130 may have been generated based on customer data 128 collected in association with online interactions of the customer 102 with the merchant (e.g., online orders placed by the customer 102, reservations made by the customer 102, interactions of the customer 102 with a social media account of the merchant, a customer review(s) of the merchant posted by the customer 102, etc.). In some examples, the customer profile 130 may have been generated based on customer data 128 collected in association with one or more past interactions of the customer 102 with other merchants different from the merchant associated with the merchant location 116 that the customer is going to visit. In some examples, the accessing of the customer profile 130 at block 904 includes accessing a group profile 130 associated with multiple customers (e.g., a first customer, a second customer, etc.) based at least in part on respective IDs of the multiple customers.

At 906, table availability data 158 is accessed, the table availability data 158 indicating at least past availability of tables at the merchant location 116, and potentially also current availability of tables at the merchant location 116. In some examples, the table availability data 158 may be accessed from a data store(s) 142 at block 906. In an illustrative example, the table availability data 158 may indicate that a party of two dined at Table 1 at a merchant location 116 on a Wednesday afternoon for 1.5 hours, followed by a party of four that dined at Table 1 on Wednesday evening for 2.3 hours, and so on and so forth, and similar table availability data 158 may indicate past availability of other tables at the merchant location 116 as well, including data that indicates times and days when tables were unused and for how long they were unused (e.g., empty, available, etc.).

At 908, a time slot 610 for the reservation is determined based at least in part on the customer profile 130 and the table availability data 158. The time slot 610 may indicate a start time of the reservation and an end time of the reservation. The customer profile 130 may be analyzed to determine one or more characteristics of the customer 102 that may influence the predicted duration of the customer's 102 upcoming visit, such as whether the customer(s) 102 is/are a fast diner(s) or a slow diner(s) based at least in part on a visitation history of the customer(s) 102 (e.g., times and/or durations of past visits by the customer(s) 102 to the merchant location 116), how much money the customer(s) 102 typically spend(s) on a given day/night, or how their spend at the merchant location 116 varies day-to-day at the merchant location 116, the customer's 102 status in terms of whether they are a VIP, a friends and family member, a regular, a rewards member, a loyalty member, etc., allergies and/or dietary restrictions of the customer 102, events (e.g., birthdays, anniversaries, etc.) associated with the customer 102, or the like. In some examples, the time slot 610 is determined at block 908 at least in part based on other factors, such as the party size (e.g., a party of two, a party of four, etc.) of the reservation, the day and/or the time of day of the reservation (e.g., whether the reservation is on Valentine's Day at dinner time, on Mother's Day at brunch time, or a random Wednesday at a mid-afternoon start time), the table that the customer(s) 102 is/are likely to be seated at, the type of restaurant (e.g., a fancy, full service restaurant with several courses of dinner and dessert will generally take longer to dine at than a quick service restaurant), or the like, some or all of which may have been specified by the customer 102 in the request 600 and/or determined automatically by the computing system (e.g., the reservation component 138). In an example, the customer 102 may be a relatively fast diner and is making a reservation for a party of two. In this example, the time slot 610 determined at block 908 may be a shorter-than-usual time slot that would likely be too short for a larger party or a slower diner than the customer 102. For example, the customer profile 130 of the customer 102 may indicate that the customer frequently stops in to the merchant location 116 before a show at a nearby venue, and the customer 102 is "in-and-out" quickly. This can be contrasted with a customer who is a VIP customer that enjoys spending a long time at the merchant location 116 on each visit, for example. In another example, a past spend of the customer 102 (as indicated in the customer profile 130 of the customer 102) may indicate that the customer 102 often spends relatively small amounts of money at the merchant location 116, so the time slot 610 determined for this customer at block 908 may be for a shorter duration at a time other than a "prime-time" slot (e.g., Friday night) that is very lucrative for the merchant location 116. In some examples, the customer 102 may be a new customer (as determined from the customer profile 130 of the customer), and, in order to drive new business, the time slot 610 determined at block 908 may be for a relatively longer duration to ensure a good customer experience and/or the new customer may be offered more options for time slots when making the reservation.

At 910, in some examples, an AI model(s) 154 may be used to output a prediction of a duration of the visit of the customer 102 to the merchant location 116 based at least in part on the customer profile 130 and the table availability data 158. Accordingly, the determining of the time slot 610 at block 908 may be based at least in part on the prediction output by the AI model(s) 154.

At 912, in some examples, a recommended table among multiple tables at the merchant location 116 may be determined for the customer 102 based at least in part on the customer profile 130 and the table availability data 158. For example, if the customer profile 130 of the customer 102 indicates that their favorite table at the merchant location 116 is Table #4, assuming that table is available at the requested time, the customer's favorite table may be recommended at block 912 for the reservation. In another example, based at least in part on the customer's 102 status (e.g., VIP, regular, etc.), a table of a particular type (e.g., a VIP table) may be recommended for the customer 102.

At 914, reservation data 152 is stored in memory to make the reservation for the customer 102. In some examples, the reservation data 152 may be stored in the data store(s) 142 to make the reservation for the customer 102. In some examples, the reservation data 152 indicates at least the time slot 610 determined at block 908. In some examples, the reservation data 152 indicates additional details 614, such as the recommended table, the party size, etc. An example of reservation details 614 that may be stored as part of the reservation data 152 is shown in FIG. 6.

At 916, a determination is made as to whether staffing data 146 should be checked for the time of the reservation. For example, the process 900 may wait until a time that is closer to the start time of the reservation to determine, from the staffing data 916, a number of workers (e.g., servers, kitchen staff, hosts, etc.) who are, or will be, working at the merchant location 116 during the time slot 610 for the reservation. For example, the determination at block 916 may be a determination as to whether the current time is before the start time and within a threshold time period (e.g., days, a day, hours, etc.) of the start time of the reservation. If the current time is not within the threshold time period of the start time of the reservation, the process 900 may follow the NO route from block 916 to continue monitoring the time (or another suitable event) to determine whether to check the staffing data 146. If it is an opportune time to check the staffing data 146 (e.g., a time before, and within a threshold time period of, the start time of the reservation), the process 900 may follow the YES route from block 916 to block 918.

At 918, a determination is made as to whether to adjust the time slot 610 for the reservation based at least in part on staffing data 146 associated with the merchant location 116. The determination at block 918 may include accessing staffing data 146 (e.g., from a data store(s) 142) indicating a number of workers who are, or will be, working at the merchant location 116 during the time slot 610 for the reservation. If, for example, the staffing data 146 indicates that the merchant location 116 is, or will be, fully staffed during the time slot 610 for the reservation, the process 900 may follow the NO route from block 918 to block 920 based on a determination that the time slot 610 should not be adjusted, and, at block 920, the system may refrain from adjusting the time slot 610. If, on the other hand, the staffing data 146 indicates that the merchant location 116 is, or will be, understaffed (e.g., several workers called in sick and/or kitchen capacity is limited on the day of the reservation), the process 900 may follow the YES route from block 918 to block 922.

At 922, the end time of the reservation is modified based at least in part on the staffing data 146 to adjust the time slot 610 to obtain an adjusted time slot 610. For example, if the merchant location 116 is, or will be, understaffed at the time of the reservation, the time slot 610 may be increased by adjusting the end time of the reservation (e.g., by a number of minutes) to account for service that may take longer than usual due to the merchant location 116 being understaffed.

At 924, updated reservation data 152 is stored, in memory, to modify the reservation for the customer 102. In some examples, the updated reservation data 152 may be stored in the data store(s) 142 to adjust/update the reservation for the customer 102. In some examples, the updated reservation data 152 indicates at least the adjusted time slot 610 based on the modification of the end time of the reservation at block 922.

In some examples, if the customer 102 cancels their reservation prior to the start time of the reservation, the computing system may be configured to reallocate or reassign the time slot 610 to another customer who "fits" the time slot 610. For example, customers can request to be notified if a reservation for a particular time window at a merchant location 116 is canceled such that the system maintains a list of customers who have requested to be notified if a reservation is canceled. If the customer 102 cancels their reservation, the system may access the list of customers who have requested to be notified, select a customer from the list that is suitable for the time slot 610 of the reservation, and send a notification to the selected customer that they can make a reservation at the merchant location for the start time of the time slot 610. For example, the system may analyze the customer profiles 130 of the customers who have requested to be notified using the techniques described herein to predict respective durations of the customers' visits to the merchant location 116, and the customer associated with a predicted duration that best matches the time slot 610 may be selected to be notified and/or offered the time slot 610. In some examples, if multiple customers would be suitable for the time slot 610, a tie-breaker algorithm may be implemented to notify one of those customers (e.g., notify the customer who was first to request to be notified—a first-come-first-server algorithm, notify the customer with the highest rewards points, loyalty points, etc.).

FIG. 10 is an example process 1000 for sending an invitation to a customer 102 based at least in part on a recent or upcoming shipment of an item preferred by the customer 102, according to an implementation of the present subject matter. The process 1000 can be implemented by a system (e.g., a computing system(s)) including one or more processors and memory storing computer-executable instructions to cause the one or more processors to perform the process 1000. In some examples, the process 1000 can be implemented by a server(s) 114 (and/or by a processor(s) of the server(s) 114), by a server(s) 120 (and/or by a processor(s)

of the server(s) 120), by an electronic device(s) 118 at a merchant location 116, by a computing system 204, by a computing system 604, or a combination thereof. For discussion purposes, the process 1000 is described with reference to the previous figures.

At 1002, a customer profile 130 of a customer 102 is updated before, during, and/or after a visit of the customer 102 to a merchant location 116 based at least in part on customer data 128 generated before, during, and/or after a visit of the customer 102 to a merchant location 116. For example, the customer 102 may use a new payment method at a merchant location 116 (e.g., a new credit card, a payment application used for the first time, etc.), and the customer profile 130 of the customer 102 may be updated based at least in part on the payment method used, as described herein. In this example, the updating can occur during the visit and/or after the visit. In some examples, the customer data 128 generated and used to update the customer profile 130 at block 1002 may indicate one or more interactions between the customer 102 and the server 104 that occurred during the visit. For example, if the customer 102 informs a server 104 at the merchant location 116 about an allergy to nuts, the server 104 may edit the customer profile 130 of the customer 102 by, for example, interacting with the edit icon 310 presented via a user interface 300B of the server's 104 electronic device 108. In some examples, the customer 102 may edit their own customer profile 130 at any suitable time using an electronic device 106, and/or the customer 102 may make a reservation at a merchant location 116 or otherwise interact with the merchant from a remote location, and the updating may occur at block 1002 based at least in part on this interaction of the customer with the merchant.

At 1004, a customer profile 130 of the customer 102 is accessed. In some examples, the customer profile 130 is accessed from a data store(s) 124 at block 1004. The accessing of the customer profile at block 1004 may be in response to any suitable trigger event, such as a periodic access of the customer profile 130, in response to a lapse of a period of time since a most-recent visit of a customer 102 to a merchant location 116, or the like.

At 1006, item availability data 140 is accessed, the item availability data 140 indicating whether items are in stock at the merchant location 116. In some examples, the item availability data 140 is accessed from a data store(s) 142 at block 1006. In some examples, the item availability data 140 includes a list of items that are typically available for purchase at the merchant location 116, labeled with an indicator (e.g., in stock, out of stock, etc.) to indicate whether those items are currently available at the merchant location 116 or not. In some examples, if an out-of-stock item has been shipped to the merchant location 116, but the item has not yet been received at the merchant location 116, the item availability data 140 may indicate an estimated delivery date of the item to the merchant location 116. In some examples, the merchant location 116 is a restaurant, and the items included in the item availability data 140 include food items (e.g., prepared meals, beverages, etc.).

At 1008, a determination is made as to whether to notify the customer 102 regarding a shipment of an item(s) preferred by the customer 102. In some examples, the determination at block 1008 may include determining, based at least in part on the customer profile 130 and the item availability data 140, that a shipment of an item(s) preferred by the customer 102 that was/were previously out of stock at the merchant location 116 at a time of a recent visit has been, or will be, received at the merchant location 116. If it is determined to refrain from notifying the customer 102 (e.g., no shipments of a preferred item(s) have been, or will be, received at the merchant location 116), the process 1000 may follow the NO route from block 1008 to block 1010, where the process 1000 may wait for a period of time and subsequently return to block 1006 where the item availability data 140 is accessed again in case the item availability data 140 has been updated in the interim (e.g., during the waiting period at block 1010). If it is determined, at block 1008, to notify the customer 102 (e.g., if a shipment of a preferred item(s) has been, or will be, received at the merchant location 116), the process 1000 may follow the YES route from block 1008 to block 1012.

At 1012, in response to determining to notify the customer 102 (e.g., in response to determining that the shipment of a preferred item(s) has been, or will be, received at the merchant location 116), an invitation is sent to the customer 102 to revisit the merchant location 116, the invitation indicating that the preferred item(s) is/are in stock at the merchant location 116. An example of such an invitation 402 that can be sent at block 1012 is shown in FIG. 4 as a text message, by way of example.

Figure 11:
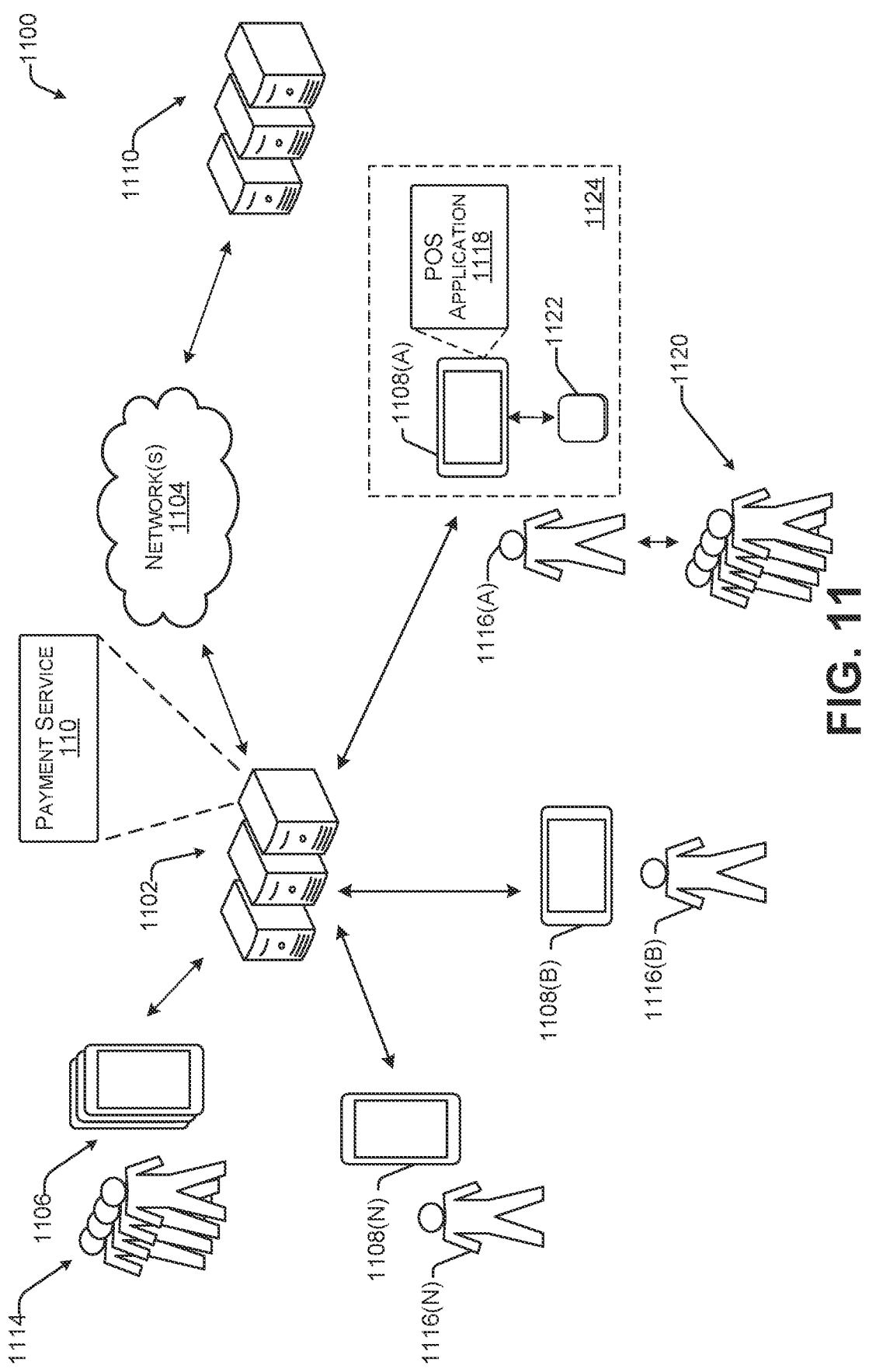
FIG. 11 is an example environment for performing techniques described herein.

FIG. 11 is an example environment 1100 for performing techniques described herein. The environment 1100 includes server(s) 1102 that can communicate over a network 1104 with user devices 1106 (which, in some examples can be merchant devices 1108 (individually, 1108(A)-1108(N))) and/or server(s) 1110 associated with third-party service provider(s). The server(s) 1102 can be associated with a service provider that can provide one or more services for the benefit of users 1114, as described below. Actions attributed to the service provider can be performed by the server(s) 1102.

For example, the server(s) 1102 may be the same as or similar to the server(s) 114 and/or the server(s) 120 introduced in FIG. 1, and the server(s) 1102 may implement the payment service 110 and/or the merchant service 112, which may implement some of the techniques described herein. Furthermore, the network(s) 1104 may be the same as or similar to the network(s) 122 introduced in FIG. 1.

The environment 1100 can include a plurality of user devices 1106, as described above. Each one of the plurality of user devices 1106 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. The individual user devices 1106 (and in some examples, the merchant devices 1108) may be the same as or similar to the electronic devices 106, 108, and/or 118 introduced in FIG. 1. In some examples, individual ones of the user devices can be operable by users 1114. The users 1114 can be referred to as customers, buyers, merchants, sellers, borrowers, employees, employers, payors, payees, couriers and so on. The users 1114 can interact with the user devices 1106 via user interfaces presented via the user devices 1106. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1106 can have an instance or versioned instance of an application, which can be downloaded from an application store, for example, which can present the user interface(s) described herein. In at least one example, a user 1114 can interact with the user interface via touch input, spoken input, or any other type of input.

As described above, in at least one example, the users 1114 can include merchants 1116 (individually, 1116(A)-1116(N)). The individual users 1114 may be the same as or similar to the customer 102 introduced in FIG. 1, and the merchants 1116 may be the same as or similar to the server 104 introduced in FIG. 1. In an example, the merchants 1116 can operate respective merchant devices 1108, which can be user devices 1106 configured for use by merchants 1116. For the purpose of this discussion, a "merchant" can be any entity that offers items (e.g., goods or services) for purchase or other means of acquisition (e.g., rent, borrow, barter, etc.). The merchants 1116 can offer items for purchase or other means of acquisition via brick-and-mortar stores, mobile stores (e.g., pop-up shops, food trucks, etc.), online stores, combinations of the foregoing, and so forth. In some examples, at least some of the merchants 1116 can be associated with a same entity but can have different merchant locations and/or can have franchise/franchisee relationships. In additional or alternative examples, the merchants 1116 can be different merchants. That is, in at least one example, the merchant 1116(A) is a different merchant than the merchant 1116(B) and/or the merchant 1116(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 1108 can have an instance of a POS application 1118 stored thereon. The POS application 1118 can configure the merchant device 1108 as a POS terminal, which enables the merchant 1116(A) to interact with one or more customers 1120. As described above, the users 1114 can include customers, such as the customers 1120 shown as interacting with the merchant 1116(A). For the purpose of this discussion, a "customer" can be any entity that acquires items from merchants. While only four customers 1120 are illustrated in FIG. 11, any number of customers 1120 can interact with the merchants 1116. Further, while FIG. 11 illustrates the customers 1120 interacting with the merchant 1116(A), the customers 1120 can interact with any of the merchants 1116.

In accordance with the examples described herein, the server(s) 1102 may receive, in association with a visit of a customer 1120 to a merchant location of a merchant 1116 (A), an ID 202 of the customer 1120. The server(s) 1102 may access, based at least in part on the ID 202, a customer profile 130 of the customer 1120. The server(s) 1102 may access item availability data 140 indicating whether items are in stock at the merchant location. The server(s) 1102 may generate, based at least in part on the customer profile 130 and the item availability data 140, a recommendation(s) 148, 308, 508 associated with an item(s) that is in stock at the merchant location. The server(s) 1102 may receive an indication 212 that the customer 1120 is at the merchant location, and in response to the receiving of the indication 212, the server(s) 1102 may determine a server 104, and cause an electronic device 1108 of the server 104 to output the recommendation(s) 148, 308, 508.

In at least one example, interactions between the customers 1120 and the merchants 1116 that involve the exchange of funds (from the customers 1120) for items (from the merchants 1116) can be referred to as "transactions." In at least one example, the POS application 1118 can determine transaction data associated with the POS transactions. Transaction data can include payment information, which can be obtained from a reader device 1122 associated with the merchant device 1108(A), user authentication data, purchase amount information, point-of-purchase information (e.g., item(s) purchased, date of purchase, time of purchase, etc.), etc. The POS application 1118 can send transaction data to the server(s) 1102 such that the server(s) 1102 can track transactions of the customers 1120, merchants 1116, and/or any of the users 1114 over time. Furthermore, the POS application 1118 can present a UI to enable the merchant 1116(A) to interact with the POS application 1118 and/or the service provider via the POS application 1118.

In at least one example, the merchant device 1108(A) can be a special-purpose computing device configured as a POS terminal (via the execution of the POS application 1118). In at least one example, the POS terminal may be connected to a reader device 1122, which is capable of accepting a variety of payment instruments, such as credit cards, debit cards, gift cards, short-range communication based payment instruments, and the like, as described below. In at least one example, the reader device 1122 can plug in to a port in the merchant device 1108(A), such as a microphone port, a headphone port, an audio-jack, a data port, or other suitable port. In additional or alternative examples, the reader device 1122 can be coupled to the merchant device 1108(A) via another wired or wireless connection, such as via a Bluetooth®, BLE, and so on. Additional details are described below with reference to FIG. 16. In some examples, the reader device 1122 can read information from alternative payment instruments including, but not limited to, wristbands and the like.

In some examples, the reader device 1122 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 1122, and communicate with the server(s) 1102, which can provide, among other services, a payment processing service. The server(s) 1102 associated with the service provider can communicate with server(s) 1110, as described below. In this manner, the POS terminal and reader device 1122 may collectively process transaction(s) between the merchants 1116 and customers 1120. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 1122 of the POS system 1124 are shown as separate devices, in additional or alternative examples, the POS terminal and the reader device 1122 can be part of a single device. In some examples, the reader device 1122 can have a display integrated therein for presenting information to the customers 1120. In additional or alternative examples, the POS terminal can have a display integrated therein for presenting information to the customers 1120. POS systems, such as the POS system 1124, may be mobile, such that POS terminals and reader devices may process transactions in disparate locations across the world. POS systems can be used for processing card-present transactions and card-not-present (CNP) transactions, as described below.

A card-present transaction is a transaction where both a customer 1120 and his or her payment instrument are physically present at the time of the transaction. Card-present transactions may be processed by swipes, dips, taps, or any other interaction between a physical payment instrument (e.g., a card), or otherwise present payment instrument, and a reader device 1122 whereby the reader device 1122 is able to obtain payment data from the payment instrument. A swipe is a card-present transaction where a customer 1120 slides a card, or other payment instrument, having a magnetic strip through a reader device 1122 that captures payment data contained in the magnetic strip. A dip is a card-present transaction where a customer 1120 inserts a payment instrument having an embedded microchip (i.e., chip) into a reader device 1122 first. The dipped payment instrument remains in the payment reader until the reader device 1122 prompts the customer 1120 to remove the card, or other payment instrument. While the payment instrument is in the reader device 1122, the microchip can create a one-time code which is sent from the POS system 1124 to the server(s) 1110 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 1120 may tap or hover his or her payment instrument (e.g., card, electronic device such as a smart phone running a payment application, etc.) over a reader device 1122 to complete a transaction via short-range communication (e.g., NFC, RFID, Bluetooth®, BLE, etc.). Short-range communication enables the payment instrument to exchange information with the reader device 1122. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 1124, the server(s) 1102, and/or the server(s) 1110 may exchange payment information and transaction data to determine whether transactions are authorized. For example, the POS system 1124 may provide encrypted payment data, user authentication data, purchase amount information, point-of-purchase information, etc. (collectively, transaction data) to server(s) 1102 over the network(s) 1104. The server(s) 1102 may send the transaction data to the server(s) 1110. As described above, in at least one example, the server(s) 1110 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 1110 associated therewith) can send a fund transfer request to a server computing device of a card payment network (e.g., Mastercard®, VISA®, etc.) to determine whether the transaction is authorized or deficient. In at least one example, the service provider can serve as an acquirer and connect directly with the card payment network.

The card payment network (e.g., the server(s) 1110 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 1110 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 1110 associated therewith), and a payment authorization message is communicated from the issuer to the POS device via a path opposite of that described above, or via an alternate path.

As described above, the server(s) 1110, which can be associated with payment service provider(s), may determine whether the transaction is authorized based on the transaction data, as well as information relating to parties to the transaction (e.g., the customer 1120 and/or the merchant 1116(A)). The server(s) 1110 may send an authorization notification over the network(s) 1104 to the server(s) 1102, which may send the authorization notification to the POS system 1124 over the network(s) 1104 to indicate whether the transaction is authorized. The server(s) 1102 may also transmit additional information such as transaction identifiers to the POS system 1124. In one example, the server(s) 1102 may include a merchant application and/or other functional components for communicating with the POS system 1124 and/or the server(s) 1110 to authorize or decline transactions.

Based on the authentication notification that is received by the POS system 1124 from server(s) 1102, the merchant 1116(A) may indicate to the customer 1120 whether the transaction has been approved. In some examples, approval may be indicated at the POS system 1124, for example, at a display of the POS system 1124. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 1114 can access all of the services of the service provider. In other examples, the users 1114 can have gradated access to the services, which can be based on risk tolerance, IDV outputs, subscriptions, and so on. In at least one example, access to such services can be availed to the merchants 1116 via the POS application 1118. In additional or alternative examples, each service can be associated with its own access point (e.g., application, web browser, etc.).

The service provider can offer payment processing services for processing payments on behalf of the merchants 1116, as described above. For example, the service provider can provision payment processing software, payment processing hardware and/or payment processing services to merchants 1116, as described above, to enable the merchants 1116 to receive payments from the customers 1120 when conducting POS transactions with the customers 1120. For instance, the service provider can enable the merchants 1116 to receive cash payments, payment card payments, and/or electronic payments from customers 1120 for POS transactions and the service provider can process transactions on behalf of the merchants 1116.

As the service provider processes transactions on behalf of the merchants 1116, the service provider can maintain accounts or balances for the merchants 1116 in one or more ledgers. For example, the service provider can analyze transaction data received for a transaction to determine an amount of funds owed to a merchant 1116(A) for the transaction. In at least one example, such an amount can be a total purchase price less fees charged by the service provider for providing the payment processing services. Based on determining the amount of funds owed to the merchant 1116(A), the service provider can deposit funds into an account of the merchant 1116(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 1116(A) to a bank account of the merchant 1116(A) that is held at a bank or other financial institution (e.g., associated with the server(s) 1110). Scheduled deposits can occur at a prearranged time after a POS transaction is funded, which can be a business day after the POS transaction occurred, or sooner or later. In some examples, the merchant 1116(A) can access funds prior to a scheduled deposit. For instance, the merchant 1116(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 1116(A) can have a payment instrument that is linked to the stored balance that enables the merchant to access the funds without first transferring the funds from the account managed by the service provider to the bank account of the merchant 1116(A).

In at least one example, the service provider may provide inventory management services. That is, the service provider may provide inventory tracking and reporting. Inventory management services may enable the merchant 1116(A) to access and manage a database storing data associated with a quantity of each item that the merchant 1116(A) has available (i.e., an inventory). Furthermore, in at least one example, the service provider can provide catalog management services to enable the merchant 1116(A) to maintain a catalog, which can be a database storing data associated with items that the merchant 1116(A) has available for acquisition (i.e., catalog management services). In at least one example, the catalog may include a plurality of data items and a data item of the plurality of data items may represent an item that the merchant 1116(A) has available for acquisition. The service provider can offer recommendations related to pricing of the items, placement of items on the catalog, and multi-party fulfilment of the inventory.

In at least one example, the service provider can provide business banking services, which allow the merchant 1116 (A) to track deposits (from payment processing and/or other sources of funds) into an account of the merchant 1116(A), payroll payments from the account (e.g., payments to employees of the merchant 1116(A)), payments to other merchants (e.g., business-to-business) directly from the account or from a linked debit card, withdrawals made via scheduled deposit and/or instant deposit, etc. Furthermore, the business banking services can enable the merchant 1116(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1116 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 1116. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the server provider associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 1114 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 1116. In at least one example, the service provider can recommend and/or generate content items to supplement omni-channel presences of the merchants 1116. That is, if a merchant of the merchants 1116 has a web page, the service provider—via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 1114 to set schedules for scheduling appointments and/or users 1114 to schedule appointments.

In some examples, the service provider can provide restaurant management services to enable users 1114 to make and/or manage reservations, to monitor front-of-house and/or back-of-house operations, and so on. In such examples, the merchant device(s) 1108 and/or server(s) 1102 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 1114 who can travel between locations to perform services for a requesting user 1114 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 1106.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 1114, voice inputs into a virtual assistant or the like, to determine intents of user(s) 1114. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 1114 may be new to the service provider such that the user 1114 that has not registered (e.g., subscribed to receive access to one or more services offered by the service provider) with the service provider. The service provider can offer onboarding services for registering a potential user 1114 with the service provider. In some examples, onboarding can involve presenting various questions, prompts, and the like to a potential user 1114 to obtain information that can be used to generate a profile for the potential user 1114. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 1114 providing all necessary information, the potential user 1114 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 1110). That is, the service provider can offer IDV services to verify the identity of users 1114 seeking to use or using their services. Identity verification requires a customer (or potential customer) to provide information that is used by compliance departments to prove that the information is associated with an identity of a real person or entity. In at least one example, the service provider can perform services for determining whether identifying information provided by a user 1114 accurately identifies the customer (or potential customer) (i.e., Is the customer who they say they are?).

The service provider is capable of providing additional or alternative services and the services described above are offered as a sampling of services. In at least one example, the service provider can exchange data with the server(s) 1110 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 1102) and/or the server(s) 1110 via the network(s) 1104. In some examples, the merchant device(s) 1108 are not capable of connecting with the service provider (e.g., the server(s) 1102) and/or the server(s) 1110, due to a network connectivity issue, for example. In additional or alternative examples, the server(s) 1102 are not capable of communicating with the server(s) 1110 due to network connectivity issue, for example. In such examples, devices may operate in "offline" mode where at least some payment data is stored (e.g., on the merchant device(s) 1108) and/or the server(s) 1102 until connectivity is restored and the payment data can be transmitted to the server(s) 1102 and/or the server(s) 1110 for processing.

In at least one example, the service provider can be associated with a hub, such as an order hub, an inventory hub, a fulfillment hub and so on, which can enable integration with one or more additional service providers (e.g., associated with the additional server(s) 1110). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 1106 that are in communication with one or more server computing devices 1102 of the service provider. That is, techniques described herein are directed to a specific implementation—or, a practical application—of utilizing a distributed system of user devices 1106 that are in communication with one or more server computing devices 1102 of the service provider to perform a variety of services, as described above. The unconventional configuration of the distributed system described herein enables the server(s) 1102 that are remotely-located from end-users (e.g., users 1114) to intelligently offer services based on aggregated data associated with the end-users, such as the users 1114 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1114 and user devices 1106. Furthermore, such features are changed dynamically based on the profiles of the users involved interacting with the GUIs. As such, techniques described herein are directed to improvements to computing systems.

FIG. 12 is an example data store 1200 used for performing techniques described herein. The data store(s) 1200 can be associated with the server(s) 1102. The data store(s) 1200 may be the same as or similar to the data store(s) 124 and/or the data store(s) 142 introduced in FIG. 1.

In at least one example, the data store(s) 1200 can store assets in an asset storage 1202, as well as data in user account(s) 1204, merchant account(s) 1206, and/or customer account(s) 1208. In at least one example, the asset storage 1202 can be used to store assets managed by the service provider of FIG. 11. In at least one example, the asset storage 1202 can be used to record whether individual of the assets are registered to users. For example, the asset storage 1202 can include an asset wallet 1210 for storing records of assets owned by the service provider of FIG. 11, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 1110 can be associated therewith. In some examples, the asset wallet 1210 can communication with the asset network via one or more components associated with the server(s) 1102.

The asset wallet 1210 can be associated with one or more addresses and can vary addresses used to acquire assets (e.g., from the asset network(s)) so that its holdings are represented under a variety of addresses on the asset network. In examples where the service provider of FIG. 11 has its own holdings of cryptocurrency (e.g., in the asset wallet 1210), a user can acquire cryptocurrency directly from the service provider of FIG. 11. In some examples, the service provider of FIG. 11 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 1202 may contain ledgers that store records of assignments of assets to users 1114, 1116. Specifically, the asset storage 1202 may include asset ledger 1210, fiat currency ledger 1214, and other ledger(s) 1216, which can be used to record transfers of assets between users 1114, 1116 of the service provider and/or one or more third-parties (e.g., merchant network(s), payment card network(s), ACH network(s), equities network(s), the asset network, securities networks, etc.). In doing so, the asset storage 1202 can maintain a running balance of assets managed by the service provider of FIG. 11. The ledger(s) of the asset storage 1202 can further indicate some of the running balance for each of the ledger(s) stored in the asset storage 1202 is assigned or registered to one or more user account(s) 1204.

In at least one example, the asset storage 1202 can include transaction logs 1218, which can include records of past transactions involving the service provider of FIG. 11. In at least one example, transaction data, as described herein, can be stored in association with the transaction logs 1218.

In some examples, the data store(s) 1200 can store a private blockchain 1219. A private blockchain 1219 can function to record sender addresses, recipient addresses, public keys, values of cryptocurrency transferred, and/or can be used to verify ownership of cryptocurrency tokens to be transferred. In some examples, the service provider of FIG. 11 can record transactions taking place within the service provider of FIG. 11 involving cryptocurrency until the number of transactions has exceeded a determined limit (e.g., number of transactions, storage space allocation, etc.). Based at least in part on determining that the limit has been reached, the service provider of FIG. 11 can publish the transactions in the private blockchain 1219 to a public blockchain (e.g., associated with the asset network), where miners can verify the transactions and record the transactions to blocks on the public blockchain. In at least one example, the service provider of FIG. 11 can participate as miner(s) at least for its transactions to be posted to the public blockchain.

In at least one example, the data store(s) 1200 can store and/or manage accounts, such as user account(s) 1204, merchant account(s) 1206, and/or customer account(s) 1208. In at least one example, the user account(s) 1204 may store records of user accounts associated with the users 1114. In at least one example, the user account(s) 1204 can include a user account 1220, which can be associated with a user (of the users 1114). Other user accounts of the user account(s) 1204 can be similarly structured to the user account 1220, according to some examples. In other examples, other user accounts may include more or less data and/or account information than that provided by the user account 1220. In at least one example, the user account 1220 can include user account data 1228, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1228 can include account activity 1230 and user wallet key(s) 1232. The account activity 1230 may include a transaction log for recording transactions associated with the user account 1220. In some examples, the user wallet key(s) 1232 can include a public-private key-pair and a respective address associated with the asset network or other assert networks. In some examples, the user wallet key(s) 1232 may include one or more key pairs, which can be unique to the asset network or other asset networks.

In addition to the user account data 1228, the user account 1220 can include ledger(s) for account(s) managed by the service provider of FIG. 11, for the user. For example, the user account 1220 may include an asset ledger 1234, a fiat currency ledger 1236, and/or one or more other ledgers 1238. The ledger(s) can indicate that a corresponding user utilizes the service provider of FIG. 11 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider of FIG. 11.

In some examples, the asset ledger 1234 can store a balance for each of one or more cryptocurrencies (e.g., Bitcoin, Ethereum, Litecoin, etc.) registered to the user account 1220. In at least one example, the asset ledger 1234 can further record transactions of cryptocurrency assets associated with the user account 1220. For example, the user account 1220 can receive cryptocurrency from the asset network using the user wallet key(s) 1232. In some examples, the user wallet key(s) 1232 may be generated for the user upon request. User wallet key(s) 1232 can be requested by the user in order to send, exchange, or otherwise control the balance of cryptocurrency held by the service provider of FIG. 11 (e.g., in the asset wallet 1210) and registered to the user. In some examples, the user wallet key(s) 1232 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 11 and the value is credited as a balance in asset ledger 1234), by purchasing currency in the form associated with the account using currency in a different form (e.g., buying a value of cryptocurrency from the service provider of FIG.

11 using a value of fiat currency reflected in fiat currency ledger, and crediting the value of cryptocurrency in asset ledger 1234), or by conducting a transaction with another user (customer or merchant) of the service provider of FIG. 11 wherein the account receives incoming currency (which can be in the form associated with the account or a different form, in which the incoming currency may be converted to the form associated with the account). In some examples, the user account data 1228 can include preferences for maintaining balances of individual of the ledgers. For example, the service provider of FIG. 11 can automatically debit the fiat currency ledger 1236 to increase the asset ledger 1234, or another account associated with the user whenever the cryptocurrency balance (e.g., of the asset ledger 1234) falls below a stated level (e.g., a threshold). Conversely, in some embodiments, the service provider of FIG. 11 can automatically credit the fiat currency ledger 1236 to decrease the asset ledger 1234 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party (e.g., associated with the third-party server(s) 120) unrelated to the service provider of FIG. 11 (i.e., an external account). In at least one example, the user can transfer all or a portion of a balance of the cryptocurrency stored in the third-party cryptocurrency wallet to the service provider of FIG. 11. Such a transaction can require the user to transfer an amount of the cryptocurrency in a message signed by user's private key to an address provided by the service provider of FIG. 11. In at least one example, the transaction can be sent to miners to bundle the transaction into a block of transactions and to verify the authenticity of the transactions in the block. Once a miner has verified the block, the block is written to a public, distributed blockchain where the service provider of FIG. 11 can then verify that the transaction has been confirmed and can credit the user's asset ledger 1234 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 11. As described above, in some examples, the service provider of FIG. 11 can acquire cryptocurrency from a third-party source (e.g., associated with the third-party server(s)). In such examples, the asset wallet 1210 can be associated with different addresses and can vary addresses used to acquire cryptocurrency so that its holdings are represented under a variety of addresses on a blockchain. When the service provider of FIG. 11 has their own holdings of cryptocurrency, users can acquire cryptocurrency directly from the service provider of FIG. 11. In some examples, the service provider of FIG. 11 can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the service provider of FIG. 11 has its own cryptocurrency assets, cryptocurrency transferred in a transaction (e.g., data with address provided for receipt of transaction and a balance of cryptocurrency transferred in the transaction) can be stored in the asset wallet 1210. In at least one example, the service provider of FIG. 11 can credit the asset ledger 1234 of the user. Additionally, while the service provider of FIG. 11 recognizes that the user retains the value of the transferred cryptocurrency through crediting the asset ledger 1234, any person that inspects the blockchain will see the cryptocurrency as having been transferred to the service provider of FIG. 11. In some examples, the asset wallet 1210 can be associated with many different addresses. In such examples, any person that inspects the blockchain may not easily associate all cryptocurrency stored in asset wallet 1210 as belonging to the same entity. It is this presence of a private ledger that is used for real-time transactions and maintained by the service provider of FIG. 11, combined with updates to the public ledger at other times, that allows for extremely fast transactions using cryptocurrency to be achieved. In some examples, the "private ledger" can refer to the asset ledger 1210, which in some examples, can utilize the private blockchain 1219, as described herein. The "public ledger" can correspond to a public blockchain associated with the asset network.

In at least one example, a user's asset ledger 1234, fiat currency ledger 1236, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1234. In some examples, a user can receive fiat currency or another currency in the form of payment for a transaction with another user. In at least one example, at least a portion of such funds can be converted into cryptocurrency by the service provider of FIG. 11 and used to fund the asset ledger 1234 of the user.

As addressed above, in some examples, users can also have other accounts maintained by the service provider of FIG. 11. For example, a user can also have an account in U.S. dollars, which can be tracked, for example, via the fiat currency ledger 1236. Such an account can be funded by transferring money from a bank account at a third-party bank to an account maintained by the service provider of FIG. 11 as is conventionally known. In some examples, a user can receive fiat currency in the form of payment for a transaction with another user. In such examples, at least a portion of such funds can be used to fund the fiat currency ledger 1236.

In some examples, a user can have one or more internal payment cards registered with the service provider of FIG. 11. Internal payment cards can be linked to one or more of the accounts associated with the user account 1220. In some embodiments, options with respect to internal payment cards can be adjusted and managed using an application (e.g., the payment application 1118).

In at least one example, as described above, each ledger can correspond to an account of the user that is managed by the service provider of FIG. 11. In at least one example, individual of the accounts can be associated with a wallet or a stored balance for use in payment transactions, peer-to-peer transactions, payroll payments, etc.

In at least one example, the user account 1220 can be associated with an asset wallet 1240. The asset wallet 1240 of the user can be associated with account information that can be stored in the user account data 1228 and, in some examples, can be associated with the user wallet key(s) 1232. In at least one example, the asset wallet 1240 can store data indicating an address provided for receipt of a crypto-currency transaction. In at least one example, the balance of the asset wallet 1240 can be based at least in part on a balance of the asset ledger 1234. In at least one example, funds availed via the asset wallet 1240 can be stored in the asset wallet 1240 or the asset wallet 1210. Funds availed via the asset wallet 1210 can be tracked via the asset ledger 1234. The asset wallet 1240, however, can be associated with additional cryptocurrency funds.

In at least one example, when the service provider of FIG. 11 includes a private blockchain 1219 for recording and validating cryptocurrency transactions, the asset wallet 1240 can be used instead of, or in addition to, the asset ledger 1234. For example, at least one example, a merchant can provide the address of the asset wallet 1240 for receiving payments. In an example where a customer is paying in cryptocurrency and the customer has their own cryptocurrency wallet account associated with the service provider of FIG. 11, the customer can send a message signed by its private key including its wallet address (i.e., of the customer) and identifying the cryptocurrency and value to be transferred to the merchant's asset wallet 1240. The service provider of FIG. 11 can complete the transaction by reducing the cryptocurrency balance in the customer's cryptocurrency wallet and increasing the cryptocurrency balance in the merchant's asset wallet 1240. In addition to recording the transaction in the respective cryptocurrency wallets, the transaction can be recorded in the private blockchain 1219 and the transaction can be confirmed. A user can perform a similar transaction with cryptocurrency in a peer-to-peer transaction as described above. In at least one example, the cryptocurrency wallet account 1230 can be funded by a balance transfer from a third-party cryptocurrency wallet, as described above. Such a transaction can require a user to transfer an amount of cryptocurrency in a message signed by the user's private key to an address of the cryptocurrency wallet account 1230. The transferred amount of cryptocurrency can then be within the cryptocurrency wallet account 1230 for use in later transactions.

While the asset ledger 1234 and/or asset wallet 1240 are each described above with reference to cryptocurrency, the asset ledger 1234 and/or asset wallet 1240 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider of FIG. 11 is an aspect of the technology disclosed that enables technical advantages of increased processing speed and improved security.

Figure 13:
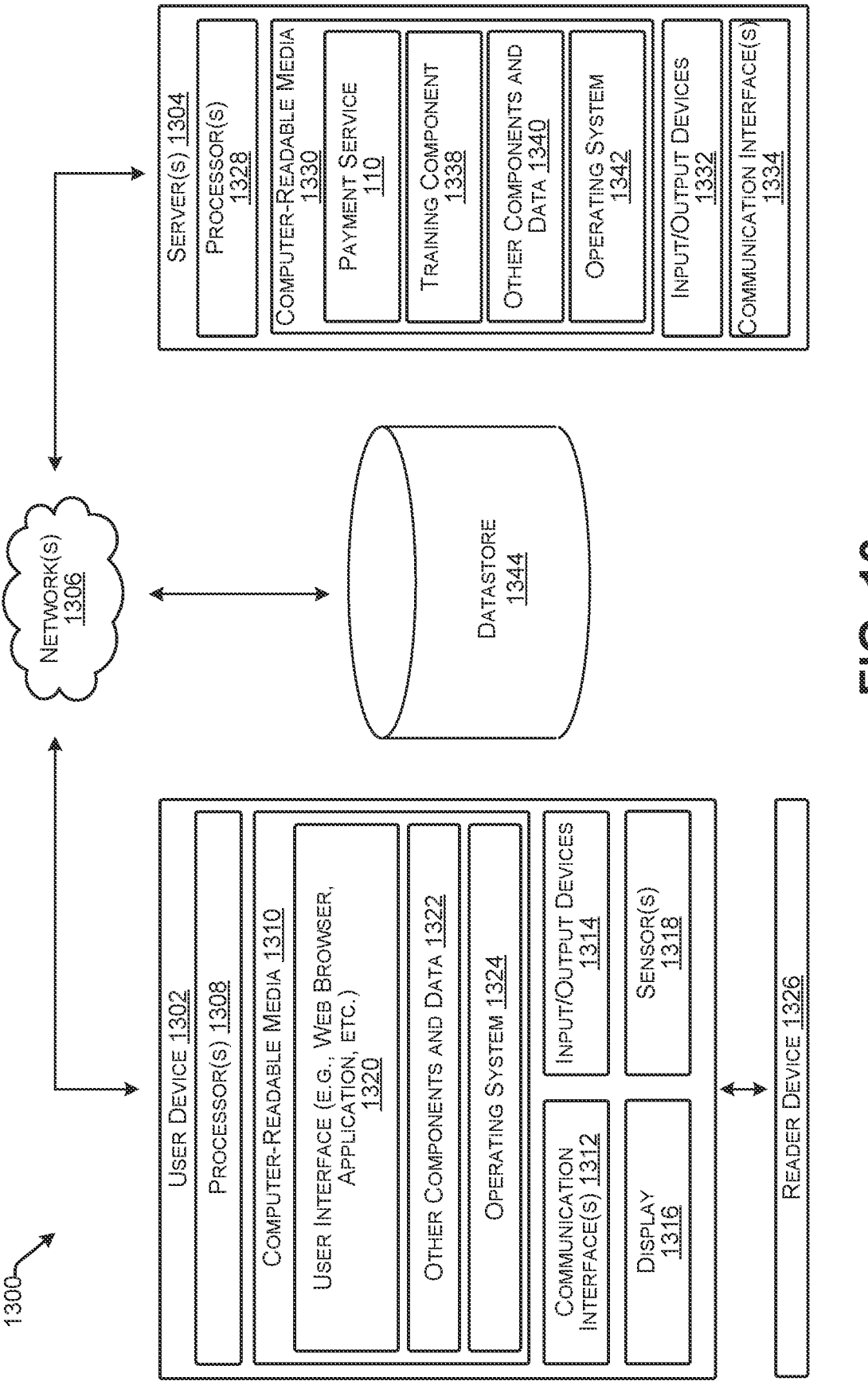
FIG. 13 is an example block diagram illustrating a system for performing techniques described herein.

FIG. 13 is an example block diagram 1300 illustrating a system for performing techniques described herein. The block diagram 1300 illustrates a system 1300 for performing techniques described herein. The system 1300 includes a user device 1302, that communicates with server computing device(s) (e.g., server(s) 1304) via network(s) 1306 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1302 is illustrated, in additional or alternate examples, the system 1300 can have multiple user devices.

For example, the server(s) 1304 may be the same as or similar to the server(s) 114 and/or the server(s) 120 introduced in FIG. 1, and the server(s) 1304 may implement the payment service 110 and/or the merchant service 112, which may implement some of the techniques described herein. Furthermore, the network(s) 1306 may be the same as or similar to the network(s) 122 introduced in FIG. 1, and the user device 1302 may be the same as or similar to the electronic devices 106, 108, and/or 118 introduced in FIG. 1.

In at least one example, the user device 1302 can be any suitable type of computing device, e.g., portable, semi-portable, semi-stationary, or stationary. Some examples of the user device 1302 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1302 can be any computing device capable of sending communications and performing the functions according to the techniques described herein. The user device 1302 can include devices, e.g., payment card readers, or components capable of accepting payments, as described below.

In the illustrated example, the user device 1302 includes one or more processors 1308, one or more computer-readable media 1310, one or more communication interface(s) 1312, one or more input/output (I/O) devices 1314, a display 1316, and sensor(s) 1318.

In at least one example, each processor 1308 can itself comprise one or more processors or processing cores. For example, the processor(s) 1308 can be implemented as one or more microprocessors, microcomputers, microcontrollers, digital signal processors, central processing units, state machines, logic circuitries, and/or any devices that manipulate signals based on operational instructions. In some examples, the processor(s) 1308 can be one or more hardware processors and/or logic circuits of any suitable type specifically programmed or configured to execute the algorithms and processes described herein. The processor(s) 1308 can be configured to fetch and execute computer-readable processor-executable instructions stored in the computer-readable media 1310.

Depending on the configuration of the user device 1302, the computer-readable media 1310 can be an example of tangible (optionally non-transitory) computer storage media and can include volatile and nonvolatile memory and/or removable and non-removable media implemented in any type of technology for storage of information such as computer-readable processor-executable instructions, data structures, program components or other data. The computer-readable media 1310 can include, but is not limited to, RAM, ROM, EEPROM, flash memory, solid-state storage, magnetic disk storage, optical storage, and/or other computer-readable media technology. Further, in some examples, the user device 1302 can access external storage, such as RAID storage systems, storage arrays, network attached storage, storage area networks, cloud storage, or any other medium that can be used to store information and that can be accessed by the processor(s) 1308 directly or through another computing device or network. Accordingly, the computer-readable media 1310 can be computer storage media able to store instructions, components or components that can be executed by the processor(s) 1308. Further, when mentioned, (optionally non-transitory) computer-readable media exclude media such as energy, carrier signals, electromagnetic waves, and signals per se.

The computer-readable media 1310 can be used to store and maintain any number of functional components that are executable by the processor(s) 1308. In some implementations, these functional components comprise instructions or programs that are executable by the processor(s) 1308 and that, when executed, implement operational logic for performing the actions and services attributed above to the user device 1302. Functional components stored in the computer-readable media 1310 can include a user interface 1320 to enable users to interact with the user device 1302, and thus the server(s) 1304 and/or other networked devices. In at least one example, the user interface 1320 can be presented via a web browser, an in-app browser 122, or the like. In other examples, the user interface 1320 can be presented via an application, such as a mobile application or desktop application, which can be provided by a service provider associated with the server(s) 1304, or which can be an otherwise dedicated application. In some examples, the user interface 1320 can be any of the user interfaces 200, 202, and/or 300 described herein. In at least one example, a user can interact with the user interface via touch input, spoken input, gesture, or any other type of input. The word "input" is also used to describe "contextual" input that may not be directly provided by the user via the user interface 1320. For example, user's interactions with the user interface 1320 are analyzed using, e.g., natural language processing techniques, to determine context or intent of the user, which may be treated in a manner similar to "direct" user input.

In accordance with the examples described herein, the server(s) 1304 may receive, in association with a visit of a customer 102 to a merchant location of a merchant, an ID 202 of the customer 102. The server(s) 1304 may access, based at least in part on the ID 202, a customer profile 130 of the customer 102. The server(s) 1304 may access item availability data 140 indicating whether items are in stock at the merchant location. The server(s) 1304 may generate, based at least in part on the customer profile 130 and the item availability data 140, a recommendation(s) 148, 308, 508 associated with an item(s) that is in stock at the merchant location. The server(s) 1304 may receive an indication 212 that the customer 102 is at the merchant location, and in response to the receiving of the indication 212, the server(s) 1304 may determine a server 104, and cause an electronic device 1302 of the server 104 to output the recommendation(s) 148, 308, 508.

Depending on the type of the user device 1302, the computer-readable media 1310 can also optionally include other functional components and data, such as other components and data 1322, which can include programs, drivers, etc., and the data used or generated by the functional components. In addition, the computer-readable media 1310 can also store data, data structures and the like, that are used by the functional components. Further, the user device 1302 can include many other logical, programmatic and physical components, of which those described are merely examples that are related to the discussion herein.

In at least one example, the computer-readable media 1310 can include additional functional components, such as an operating system 1324 for controlling and managing various functions of the user device 1302 and for enabling basic user interactions.

The communication interface(s) 1312 can include one or more interfaces and hardware components for enabling communication with various other devices, such as over the network(s) 1306 or directly. For example, communication interface(s) 1312 can enable communication through one or more network(s) 1306, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1306 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1302 can further include one or more input/output (I/O) devices 1314. The I/O devices 1314 can include speakers, a microphone, a camera, and various user controls (e.g., buttons, a joystick, a keyboard, a keypad, etc.), a haptic output device, and so forth. The I/O devices 1314 can also include attachments that leverage the accessories (audio-jack, USB-C, Bluetooth, etc.) to connect with the user device 1302.

In at least one example, user device 1302 can include a display 1316. Depending on the type of computing device(s) used as the user device 1302, the display 1316 can employ any suitable display technology. For example, the display 1316 can be a liquid crystal display, a plasma display, a light emitting diode display, an OLED (organic light-emitting diode) display, an electronic paper display, or any other suitable type of display able to present digital content thereon. In at least one example, the display 1316 can be an augmented reality display, a virtually reality display, or any other display able to present and/or project digital content. In some examples, the display 1316 can have a touch sensor associated with the display 1316 to provide a touchscreen display configured to receive touch inputs for enabling interaction with a graphic interface presented on the display 1316. Accordingly, implementations herein are not limited to any particular display technology. Alternatively, in some examples, the user device 1302 may not include the display 1316, and information can be presented by other means, such as aurally, hapticly, etc.

In addition, the user device 1302 can include sensor(s) 1318. The sensor(s) 1318 can include a GPS device able to indicate location information. Further, the sensor(s) 1318 can include, but are not limited to, an accelerometer, gyroscope, compass, proximity sensor, camera, microphone, and/or a switch.

In some example, the GPS device can be used to identify a location of a user. In at least one example, the location of the user can be used by the service provider, described above, to provide one or more services. That is, in some examples, the service provider can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users and/or for sending users notifications regarding available appointments with merchant(s) located proximate to the users. In at least one example, location can be used for taking payments from nearby customers when they leave a geofence, or location can be used to initiate an action responsive to users enter a brick-and-mortar store of a merchant. Location can be used in additional or alternative ways as well.

Additionally, the user device 1302 can include various other components that are not shown, examples of which include removable storage, a power source, such as a battery and power control unit, a barcode scanner, a printer, a cash drawer, and so forth.

In addition, in some examples, the user device 1302 can include, be connectable to, or otherwise be coupled to a reader device 1326, for reading payment instruments and/or identifiers associated with payment objects. In some examples, as described above, the reader device 1326 can plug in to a port in the user device 1302, such as a microphone port, a headphone port, an audio-jack, a data port, or other suitable port. In additional or alternative examples, the reader device 1326 can be coupled to the user device 1302 via another wired or wireless connection, such as via a Bluetooth®, BLE, and so on. The reader device 1326 can include a read head for reading a magnetic strip of a payment card, and further can include encryption technology for encrypting the information read from the magnetic strip. Additionally or alternatively, the reader device 1326 can be an EMV payment reader, which in some examples, can be embedded in the user device 1302. Moreover, numerous other types of readers can be employed with the user device 1302 herein, depending on the type and configuration of the user device 1302.

The reader device 1326 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1326 may include hardware implementation, such as slots, magnetic tracks, and rails with one or more sensors or electrical contacts to facilitate detection and acceptance of a payment instrument. That is, the reader device 1326 may include hardware implementations to enable the reader device 1326 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1326 may also include a biometric sensor to receive and process biometric characteristics and process them as payment instruments, given that such biometric characteristics are registered with the payment service system 100 and connected to a financial account with a bank server.

The reader device 1326 may include processing unit(s), computer-readable media, a reader chip, a transaction chip, a timer, a clock, a network interface, a power supply, and so on. The processing unit(s) of the reader device 1326 may execute one or more components and/or processes to cause the reader device 1326 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1326, the computer-readable media may include volatile memory (such as RAM), non-volatile memory (such as ROM, flash memory, miniature hard drive, memory card, or the like), or some combination thereof. In at least one example, the computer-readable media of the reader device 1326 may include at least one component for performing various functions as described herein.

The reader chip may perform functionalities to control the operations and processing of the reader device 1326. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 1312, which may provide a clock signal indicating a time. Furthermore, the reader chip may perform functionality to control the network interface, which may interface with the network(s) 1306, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1326. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While the user device 1302, which can be a POS terminal, and the reader device 1326 are shown as separate devices, in additional or alternative examples, the user device 1302 and the reader device 1326 can be part of a single device, which may be a battery-operated device. In such an example, components of both the user device 1302 and the reader device 1326 may be associated with the single device. In some examples, the reader device 1326 can have a display integrated therewith, which can be in addition to (or as an alternative of) the display 1316 associated with the user device 1302.

The server(s) 1304 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1304 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1304 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1304 can include one or more processors 1328, one or more computer-readable media 1330, one or more I/O devices 1332, and one or more communication interfaces 1334. Each processor 1328 can be a single processing unit or a number of processing units, and can include single or multiple computing units or multiple processing cores. The processor(s) 1328 can be implemented as one or more microprocessors, microcomputers, microcontrollers, digital signal processors, central processing units, state machines, logic circuitries, and/or any devices that manipulate signals based on operational instructions. For example, the processor(s) 1328 can be one or more hardware processors and/or logic circuits of any suitable type specifically programmed or configured to execute the algorithms and processes described herein. The processor(s) 1328 can be configured to fetch and execute computer-readable instructions stored in the computer-readable media 1330, which can program the processor(s) 1328 to perform the functions described herein.

The computer-readable media 1330 can include volatile and nonvolatile memory and/or removable and non-removable media implemented in any type of technology for storage of information, such as computer-readable instructions, data structures, program components, or other data. Such computer-readable media 1330 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1304, the computer-readable media 1330 can be a type of computer-readable storage media and/or can be a tangible (optionally non-transitory) media to the extent that when mentioned, (optionally non-transitory) computer-readable media exclude media such as energy, carrier signals, electromagnetic waves, and signals per se.

The computer-readable media 1330 can be used to store any number of functional components that are executable by the processor(s) 1328. In many implementations, these functional components comprise instructions or programs that are executable by the processors 1328 and that, when executed, specifically configure the one or more processors 1328 to perform the actions attributed above to the service provider and/or payment processing service. Functional components stored in the computer-readable media 1330 can optionally include a payment service 110 and/or the merchant service 112, as described herein, a training component 1338, and one or more other components and data 1340.

The training component 1338 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a data store associated with the user device(s) 1302 and/or the server(s) 1304 for use at a time after the data models have been trained (e.g., at runtime).

The one or more other components and data 1340 can include the sub-components of the payment service 110, the functionality of which is described, at least partially, above. Further, the one or more other components and data 1340 can include a merchant component configured to receive transaction data from POS systems, such as the POS system 1124 described above with reference to FIG. 11. Such a merchant component can transmit requests (e.g., authorization, capture, settlement, etc.) to payment service server computing device(s) to facilitate POS transactions between merchants and customers. Such a merchant component can communicate the successes or failures of the POS transactions to the POS systems. Further, the one or more other components and data 1340 can include programs, drivers, etc., and the data used or generated by the functional components. Further, the server(s) 1304 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on (optionally non-transitory) storage medium (e.g., volatile or non-volatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1330 can additionally include an operating system 1342 for controlling and managing various functions of the server(s) 1304.

The communication interface(s) 1334 can include one or more interfaces and hardware components for enabling communication with various other devices, such as over the network(s) 1306 or directly. For example, communication interface(s) 1334 can enable communication through one or more network(s) 1306, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1302 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1304 can further be equipped with various I/O devices 1332. Such I/O devices 1332 can include a display, various user interface controls (e.g., buttons, joystick, keyboard, mouse, touch screen, biometric or sensory input devices, etc.), audio speakers, connection ports and so forth.

In at least one example, the system 1300 can include a datastore 1344 that can be configured to store data that is accessible, manageable, and updatable. The data store 1344 may be the same as or similar to the data store(s) 124 and/or the data store(s) 142 introduced in FIG. 1. In some examples, the datastore 1344 can be integrated with the user device 1302 and/or the server(s) 1304. In other examples, as shown in FIG. 13, the datastore 1344 can be located remotely from the server(s) 1304 and can be accessible to the server(s) 1304. The datastore 1344 can comprise multiple databases and/or servers connected locally and/or remotely via the network(s) 1306.

In at least one example, the datastore 1344 can store user profiles, which can include merchant profiles, customer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

In at least one example, the account(s) can include or be associated with the merchant profiles and/or customer profiles described above.

Furthermore, in at least one example, the datastore 1344 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1344 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

What is claimed is:

1. A computer-implemented method comprising:

receiving, by a computing system, in association with a request to make a reservation at a merchant location of a merchant, an identifier of a customer;

accessing, by the computing system, and based on the identifier, a customer profile of the customer, the customer profile having been generated based on customer data collected in association with one or more past interactions of the customer with the merchant;

accessing, by the computing system, table availability data indicating at least past availability of tables at the merchant location;

determining, by the computing system, and based on the customer profile and the table availability data, a time slot indicating a start time of the reservation and an end time of the reservation;

storing, by the computing system, in memory, reservation data to make the reservation for the customer, the reservation data indicating at least the time slot;

accessing, by the computing system, item availability data indicating whether items are in stock at the merchant location;

generating, by the computing system, and by analyzing the customer profile and the item availability data, a recommendation associated with an item that is preferred by the customer and is in stock at the merchant location;

receiving, by the computing system, an indication that the customer has been seated at a table at the merchant location; and in response to the receiving of the indication:

determining, by the computing system, a server assigned to the table; and causing, by the computing system, an electronic device of the server to output the recommendation.

2. The computer-implemented method of claim 1, wherein:

the computer-implemented method further comprises, in response to the receiving of the indication:

causing, by the computing system, a user interface to be presented on the electronic device, wherein the user interface presents an interactive element associated with the table; and receiving, by the computing system, via the user interface, a second indication of an interaction with the interactive element; and the causing of the electronic device to output the recommendation comprises causing the user interface to present information about the customer seated at the table in response to the receiving of the second indication, the information based on the customer profile and including the recommendation.

3. The computer-implemented method of claim 1, wherein the determining of the time slot is based at least in part on the customer profile indicating, based on durations of past visits by the customer to the merchant location, whether the customer is a fast diner or a slow diner.

4. The computer-implemented method of claim 1, further comprising:

using, by the computing system, an artificial intelligence (AI) model to output a prediction of a duration of a visit of the customer to the merchant location based at least in part on the customer profile and the table availability data, wherein the determining of the time slot is based at least in part on the prediction.

5. The computer-implemented method of claim 1, further comprising:

at a time before, and within a threshold time period of, the start time of the reservation, accessing, by the computing system, staffing data indicating a number of workers who are, or will be, working at the merchant location during the time slot; and modifying, by the computing system, the end time of the reservation based at least in part on the staffing data to adjust the time slot to obtain an adjusted time slot; and storing, by the computing system, updated reservation data to modify the reservation for the customer, the updated reservation data indicating at least the adjusted time slot.

6. A system comprising:

one or more processors; and computer-executable instructions that, when executed by the one or more processors, cause the one or more processors to perform operations comprising:

receiving, in association with a request to make a reservation at a merchant location of a merchant, an identifier of a customer;

accessing, based at least in part on the identifier, a customer profile of the customer;

accessing table availability data indicating at least past availability of tables at the merchant location;

determining, based at least in part on the customer profile and the table availability data, a time slot indicating a start time of the reservation and an end time of the reservation:

storing, in memory, reservation data to make the reservation for the customer, the reservation data indicating at least the time slot;

accessing item availability data indicating whether items are in stock at the merchant location;

generating, based at least in part on the customer profile and the item availability data, a recommendation associated with an item that is in stock at the merchant location;

receiving an indication that the customer is at the merchant location; and in response to the receiving of the indication:

determining a server; and causing an electronic device of the server to output the recommendation.

7. The system of claim 6, wherein:

the request includes a party size indicating a number of customers, including the customer, associated with the reservation; and the determining of the time slot is further based on the party size.

8. The system of claim 6, the operations further comprising:

using an artificial intelligence (AI) model to output a prediction of a duration of a visit of the customer to the merchant location based at least in part on the customer profile and the table availability data, wherein the determining of the time slot is based at least in part on the prediction.

9. The system of claim 6, the operations further comprising:

determining, based at least in part on the customer profile and the table availability data, a recommended table among multiple tables at the merchant location, for the customer, wherein the reservation data further indicates the recommended table.

10. The system of claim 6, the operations further comprising:

at a time before, and within a threshold time period of, the start time of the reservation, accessing staffing data indicating a number of workers who are, or will be, working at the merchant location during the time slot; and modifying the end time of the reservation based at least in part on the staffing data to adjust the time slot to obtain an adjusted time slot; and storing updated reservation data to modify the reservation for the customer, the updated reservation data indicating at least the adjusted time slot.

11. The system of claim 6, wherein:

the indication indicates that the customer has been seated at a table at the merchant location;

the determining of the server comprises determining the server assigned to the table;

the operations further comprise, in response to the receiving of the indication:

causing a user interface to be presented on the electronic device, wherein the user interface presents an interactive element associated with the table; and receiving, via the user interface, a second indication of an interaction with the interactive element; and the causing of the electronic device to output the recommendation comprises causing the user interface to present information about the customer seated at the table in response to the receiving of the second indication, the information based at least in part on the customer profile and including the recommendation.

12. The system of claim 5, the operations further comprising:

determining, based at least in part on the customer profile and the item availability data, that a second item preferred by the customer is out of stock at the merchant location at a time of a visit of the customer to the merchant location;

after the visit, determining, based at least in part on updated item availability data, that a shipment of the second item has been, or will be, received at the merchant location; and in response to the determining that the shipment of the second item has been, or will be, received at the merchant location, sending an invitation to the customer to revisit the merchant location, the invitation indicating that the second item is in stock at the merchant location.

13. The system of claim 5, wherein:

the operations further comprise, receiving, in association with a visit of the customer to the merchant location, a second identifier of a second customer;

the accessing of the customer profile comprises accessing, based at least in part on the identifier and the second identifier, a group profile associated with the customer and the second customer; and the generating of the recommendation is based at least in part on the group profile.

14. The system of claim 5, the operations further comprising updating, during or after a visit of the customer to the merchant location, the customer profile based at least in part on customer data generated during the visit, the customer data indicating one or more interactions between the customer and the server that occurred during the visit.

15. The system of claim 6, wherein the determining of the time slot is based at least in part on the customer profile indicating, based on durations of past visits by the customer to the merchant location, whether the customer is a fast diner or a slow diner.

16. A computer-implemented method comprising:

receiving, by a computing system, in association with a request to make a reservation at a merchant location of a merchant, an identifier of a customer;

accessing, by the computing system, and based at least in part on the identifier, a customer profile of the customer;

accessing, by the computing system, table availability data indicating at least past availability of tables at the merchant location;

determining, by the computing system, and based at least in part on the customer profile and the table availability data, a time slot indicating a start time of the reservation and an end time of the reservation;

storing, by the computing system, in memory, reservation data to make the reservation for the customer, the reservation data indicating at least the time slot;

accessing, by the computing system, item availability data indicating whether items are in stock at the merchant location;

generating, by the computing system, and based at least in part on the customer profile and the item availability data, a recommendation associated with an item that is in stock at the merchant location;

receiving, by the computing system, an indication that the customer is at the merchant location; and in response to the receiving of the indication:

determining, by the computing system, a server; and causing, by the computing system, an electronic device of the server to output the recommendation.

17. The computer-implemented method of claim 16, wherein:

the indication indicates that the customer has been seated at a table at the merchant location;

the determining of the server comprises determining the server assigned to the table;

the computer-implemented method further comprises, in response to the receiving of the indication:

causing, by the computing system, a user interface to be presented on the electronic device, wherein the user interface presents an interactive element associated with the table; and receiving, by the computing system, via the user interface, a second indication of an interaction with the interactive element; and the causing of the electronic device to output the recommendation comprises causing the user interface to present information about the customer seated at the table in response to the receiving of the second indication, the information based at least in part on the customer profile and including the recommendation.

18. The computer-implemented method of claim 16, wherein:

the computer-implemented method further comprises, receiving, by the computing system, in association with a visit of the customer to the merchant location, a second identifier of a second customer;

the accessing of the customer profile comprises accessing, based at least in part on the identifier and the second identifier, a group profile associated with the customer and the second customer; and the generating of the recommendation is based at least in part on the group profile.

19. The computer-implemented method of claim 16, wherein the determining of the time slot is based at least in part on the customer profile indicating, based on durations of past visits by the customer to the merchant location, whether the customer is a fast diner or a slow diner.

20. The computer-implemented method of claim 16, further comprising:

using, by the computing system, an artificial intelligence (AI) model to output a prediction of a duration of a visit of the customer to the merchant location based at least in part on the customer profile and the table availability data, wherein the determining of the time slot is based at least in part on the prediction.

* * * * *